(12) United States Patent
Matsuo

(10) Patent No.: US 11,308,970 B2
(45) Date of Patent: Apr. 19, 2022

(54) VOICE CORRECTION APPARATUS AND VOICE CORRECTION METHOD

(71) Applicant: FUJITSU LIMITED, Kawasaki (JP)

(72) Inventor: Naoshi Matsuo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 16/674,803

(22) Filed: Nov. 5, 2019

(65) Prior Publication Data

US 2020/0194020 A1 Jun. 18, 2020

(30) Foreign Application Priority Data

Dec. 14, 2018 (JP) .............................. JP2018-234912

(51) Int. Cl.
| | |
|---|---|
| *G10L 21/0208* | (2013.01) |
| *G10L 25/30* | (2013.01) |
| *G10L 21/003* | (2013.01) |
| *G06N 20/00* | (2019.01) |
| *G10L 21/0232* | (2013.01) |
| *G10L 21/0216* | (2013.01) |

(52) U.S. Cl.
CPC .......... *G10L 21/0208* (2013.01); *G06N 20/00* (2019.01); *G10L 21/003* (2013.01); *G10L 21/0232* (2013.01); *G10L 25/30* (2013.01); *G10L 2021/02165* (2013.01); *G10L 2021/02166* (2013.01)

(58) Field of Classification Search
CPC . G10L 21/0208; G10L 21/0232; G10L 25/30; G10L 21/02
See application file for complete search history.

(56) References Cited

U.S. PATENT DOCUMENTS

| | | | | |
|---|---|---|---|---|
| 2006/0247923 | A1* | 11/2006 | Chandran | ........... G10L 21/0208 704/211 |
| 2008/0304673 | A1* | 12/2008 | Otani | ..................... H03G 9/025 381/57 |
| 2011/0191101 | A1* | 8/2011 | Uhle | ................... G10L 21/0208 704/205 |
| 2014/0149111 | A1* | 5/2014 | Matsuo | .............. G10L 21/0232 704/206 |

(Continued)

FOREIGN PATENT DOCUMENTS

| | | |
|---|---|---|
| JP | 2006-180392 | 7/2006 |
| JP | 2011-081033 | 4/2011 |
| JP | 2011-119898 | 6/2011 |

*Primary Examiner* — Samuel G Neway
(74) *Attorney, Agent, or Firm* — Fujitsu Patent Centers

(57) ABSTRACT

A voice correction method implemented by a computer, the method includes: obtaining first voice information which is voice information recorded when noise is generated and on which noise suppression processing is performed and second voice information indicating voice information recorded in an environment in which no noise is generated, and generating emphasized information by emphasizing a component of a band corresponding to a band having a low signal noise ratio (SNR) of the first voice information, among bands of the second voice information; performing machine learning on a model based on the first voice information and the emphasized information; and generating corrected voice information by correcting third voice information on which noise suppression processing is performed, based on the machine-learned model.

6 Claims, 23 Drawing Sheets

(56) References Cited

U.S. PATENT DOCUMENTS

| | | | |
|---|---|---|---|
| 2016/0111108 A1* | 4/2016 | Erdogan | G10L 21/0216 704/202 |
| 2017/0092299 A1* | 3/2017 | Matsuo | G10L 21/0216 |
| 2017/0345440 A1* | 11/2017 | Matsuo | G10L 21/0264 |
| 2020/0194020 A1* | 6/2020 | Matsuo | G10L 21/003 |

* cited by examiner

VOICE CORRECTION APPARATUS AND VOICE CORRECTION METHOD

CROSS-REFERENCE TO RELATED APPLICATION

This application is based upon and claims the benefit of priority of the prior Japanese Patent Application No. 2018-234912, filed on Dec. 14, 2018, the entire contents of which are incorporated herein by reference.

FIELD

The embodiments discussed herein are related to a voice correction apparatus and the like.

BACKGROUND

A use of a voice recognition application in a passenger compartment is increased in terms of safety and convenience. In order to use the voice recognition application safely and easily, a hands-free voice input using a microphone of a small unit installed in a car is used. Since a voice signal recorded by using the microphone includes noise such as driving noise, an air conditioner operation sound, or the like, as a preprocess of performing voice recognition, noise suppression processing is performed by using spectrum subtraction, a microphone array, or the like.

When the noise suppression processing is performed, distortion occurs in a suppression result in many cases, resulting in an unnatural voice, and a voice recognition rate decreases, in some cases. The voice recognition rate is better when the noise suppression processing is not performed than when the noise suppression processing is performed, in some cases. In particular, distortion increases in a band in which a signal noise ratio (SNR) before the noise suppression processing is performed is low. For this reason, after the noise suppression processing is performed, it is preferable to further correct a sound quality in the band having a low SNR before the noise suppression processing.

In the related art, a sound quality of a voice signal is corrected by using machine learning. FIG. 22 is a diagram for explaining a learning process according to the related art. As illustrated in FIG. 22, a learning apparatus 10 includes storage units 11a and 11b, windowing units 12a and 12b, fast Fourier transform (FFT) processing units 13a and 13b, power spectrum calculation units 14a and 14b, and a machine learning unit 15.

The storage unit 11a is a storage device which stores a noise suppressed signal. The noise suppressed signal is obtained by performing noise suppression processing on a voice signal collected by a microphone (not illustrated) in an environment where noise is generated.

The storage unit 11b is a storage device which stores a teaching signal. The teaching signal is a voice signal collected by a microphone in an ideal environment where no noise is generated.

The windowing unit 12a is a processing unit which obtains a noise suppressed signal from the storage unit 11a and performs windowing. For example, the windowing unit 12a performs windowing by overlapping time window such as Hanning window by 50%. The windowing unit 12a outputs the noise suppressed signal on which the windowing is performed to the FFT processing unit 13a.

The windowing unit 12b is a processing unit which obtains a teaching signal from the storage unit 11b and performs windowing. For example, the windowing unit 12b performs windowing such as Nanning window or the like by overlapping time window by 50%. The windowing unit 12b outputs the teaching signal on which the windowing is performed to the FFT processing unit 13b.

The FFT processing unit 13a is a processing unit which extracts a component for each frequency of a noise suppressed signal by performing FFT on the noise suppressed signal corresponding to the time window set by the windowing unit 12a. The FFT processing unit 13a outputs information on the component for each frequency of the noise suppressed signal to the power spectrum calculation unit 14a.

The FFT processing unit 13b is a processing unit which extracts a component for each frequency of a teaching signal by performing FFT on the teaching signal corresponding to the time window set by the windowing unit 12b. The FFT processing unit 13b outputs information on the component for each frequency of the teaching signal to the power spectrum calculation unit 14b.

The power spectrum calculation unit 14a is a processing unit which calculates a power spectrum for each frequency based on the component for each frequency of the noise suppressed signal. The power spectrum calculation unit 14a outputs power information for each frequency of the noise suppressed signal to the machine learning unit 15, In the following description, power information for each frequency of the noise suppressed signal is referred to as "noise suppressed power spectrum".

The power spectrum calculation unit 14b is a processing unit which calculates power for each frequency based on the component for each frequency of the teaching signal. The power spectrum calculation unit 14b outputs power information for each frequency of the teaching signal to the machine learning unit 15. In the following description, power information for each frequency of the teaching signal is referred to as "teaching power spectrum".

The windowing units 12a and 12b, the FFT processing units 13a and 13b, and the power spectrum calculation units 14a and 14b of the learning apparatus 10 repeatedly execute the processes described above, a plurality of sets of a noise suppressed power spectrum and a teaching power spectrum are output to the machine learning unit 15.

The machine learning unit 15 is a processing unit which performs machine learning on a model corrected so that a shape of the noise suppressed power spectrum approaches a shape of the teaching power spectrum, based on the plurality of sets of a noise suppressed power spectrum and a teaching power spectrum.

For example, the machine learning unit 15 inputs power $(P1(f_0), P1(f_1), P1(f_2), \ldots, \text{and } P1(f_n))$ for each frequency of the noise suppressed power spectrum to an input layer of a neural network (NN). In this case, output power of each frequency from an output layer of the NN is $(P1'(f_0), P1'(f_1), P1'(f_2), \ldots, \text{and } P1'(f_n))$.

The machine learning unit 15 adjusts a weight of the NN so that an evaluation function based on a difference between $(P1'(f_0), P1'(f_1), P1'(f_2), \ldots, \text{and } P1'(f_n))$ and power $(P2(f_0), P2(f_1), P2(f_2), \ldots, \text{and } P2(f_n))$ for each frequency of the teaching power spectrum approaches zero. By repeatedly performing the processes described above, based on the plurality of sets of the noise suppressed power spectrum and the teaching power spectrum, the machine learning unit 15 learns the weight of the NN.

The learning apparatus 10 notifies a correction device illustrated in FIG. 23 of information on the model learned by the machine learning unit 15.

FIG. 23 is a diagram for explaining a correction process according to the related art. As illustrated in FIG. 23, a correction device 20 includes storage units 21a and 21b, a windowing unit 22, an FFT processing unit 23, a power spectrum calculation unit 24, a correction unit 25, an inverse fast Fourier transform (IFFT) processing unit 26, and an overlap addition unit 27.

The storage unit 21a is a storage device which stores a noise suppressed signal which is a correction target.

The storage unit 21b is a storage device which stores a voice signal obtained by correcting a sound quality of a noise suppressed signal.

The windowing unit 22 is a processing unit which obtains a noise suppressed signal from the storage unit 21a and performs windowing. For example, the windowing unit 22 performs windowing by overlapping time window such as Nanning window by 50%. The windowing unit 22 outputs the noise suppressed signal on which the windowing is performed to the FFT processing unit 23.

The FFT processing unit 23 is a processing unit which extracts a component for each frequency of a noise suppressed signal by performing FFT on the noise suppressed signal corresponding to the time window set by the windowing unit 22. The FFT processing unit 23 outputs information on the component for each frequency of the noise suppressed signal to the power spectrum calculation unit 24. The FFT processing unit 23 outputs information on a spectrum when FFT is performed to the IFFT processing unit 26.

The power spectrum calculation unit 24 is a processing unit which calculates a power spectrum (a noise suppressed power spectrum) for each frequency based on the component for each frequency of the noise suppressed signal. The power spectrum calculation unit 24 outputs the noise suppressed power spectrum to the correction unit 25.

The correction unit 25 is a processing unit which corrects a shape of the noise suppressed power spectrum by using a model (a NN) learned by the machine learning unit 15. The correction unit 25 outputs the corrected noise suppressed power spectrum to the IFFT processing unit 26. For example, the correction unit 25 inputs power for each frequency of the noise suppressed power spectrum to the input layer of the NN, and sets each power (power for each frequency) output from the output layer of the NN as the corrected noise suppressed power spectrum. In the following description, the corrected noise suppressed power spectrum is referred to as "corrected power spectrum".

The IFFT processing unit 26 is a processing unit which corrects power of a spectrum from the FFT processing unit 23 by using a ratio of a power spectrum before correction calculated in the IFFT processing unit 26 to the corrected power spectrum from the correction unit 25 and performs inverse Fourier transform so as to convert a spectrum after power-correction into a voice signal indicating a relationship between a time and an amplitude. When the IFFT processing unit 26 performs inverse Fourier transform, information on a spectrum notified from the FFT processing unit 23 is used. The IFFT processing unit 26 outputs the voice signal on which inverse Fourier transform is performed to the overlap addition unit 27.

The overlap addition unit 27 is a processing unit which adds each voice signal output from the IFFT processing unit 26 with 50% overlap. The overlap addition unit 27 stores the overlap-added voice signal in the storage unit 21b.

Examples of the related art include Japanese Laid-open Patent Publication No. 2011-081033, Japanese Laid-open Patent Publication No. 2006-180392, and Japanese Laid-open Patent Publication No. 2011-119898.

SUMMARY

According to an aspect of the embodiments, a voice correction method implemented by a computer, the method includes: obtaining first voice information which is voice information recorded when noise is generated and on which noise suppression processing is performed and second voice information indicating voice information recorded in an environment in which no noise is generated, and generating emphasized information by emphasizing a component of a band corresponding to a band having a low signal noise ratio (SNR) of the first voice information, among bands of the second voice information; performing machine learning on a model based on the first voice information and the emphasized information; and generating corrected voice information by correcting third voice information on which noise suppression processing is performed, based on the machine-learned model.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Meanwhile, the related art described above has a problem that it is not possible to increase recognition accuracy of a voice signal on which the noise suppression processing is performed in an environment in which noise is generated.

For example, a relationship between an SNR, power (level) of a power spectrum, and noise is as follows. "A band having a low SNR corresponds to a band having low power of a power spectrum, and this band is greatly affected by noise". On the other hand, "a band having a high SNR corresponds to a band having high power of a power spectrum, and this band is less affected by noise".

According to the relationship described above, when noise suppression processing is performed on a voice signal, in many cases, the amount of suppression increases and distortion increases as an SNR of a band is lower.

In a learning process described with reference to FIG. 2, a model is learned so that a value of an evaluation function based on a difference between a noise suppressed power spectrum and a teaching power spectrum approaches zero. Since the difference between the noise suppressed power spectrum and the teaching power spectrum becomes larger in a band in which power is large, in the model learned by the learning process described above, correction by weighting of giving priority to a band in which power is large is performed.

For example, in the learning method described above, correction for a band having a large amount of distortion (a band having a low SNR) caused by the noise suppression processing is insufficient.

In one aspect, an object of the present embodiments is to provide a voice correction apparatus and a voice correction method capable of increasing recognition accuracy of a voice signal on which noise suppression processing is performed in an environment in which noise is generated.

It is possible to increase recognition accuracy of a voice signal on which noise suppression processing is performed in an environment in which noise is likely to be generated.

Hereinafter, embodiments of a voice correction apparatus and a voice correction method disclosed in the present application will be described in detail with reference to the drawings. The present embodiment is not limited by this example.

Embodiment 1

Figure 1:
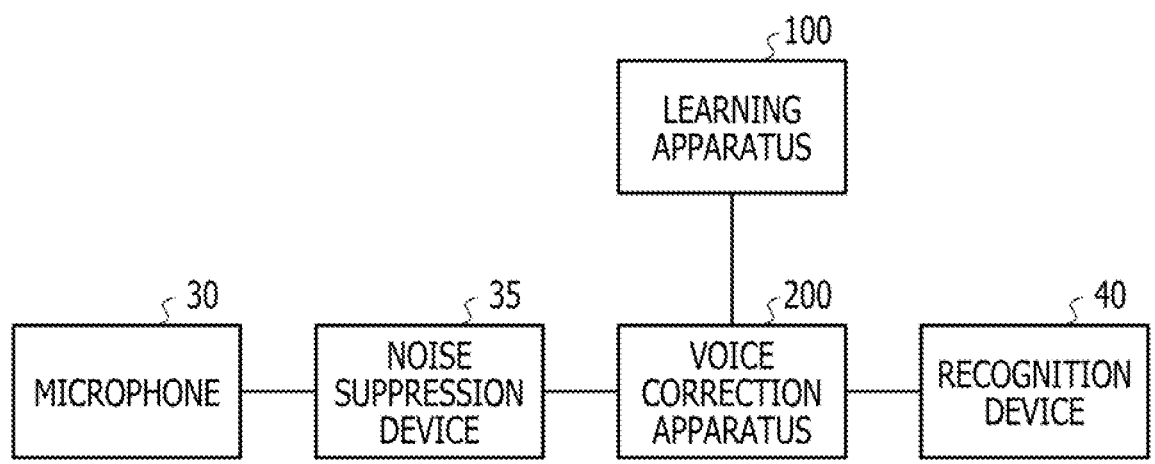
FIG. 1 is a diagram illustrating an example of a system according to Embodiment 1.

FIG. 1 is a diagram illustrating an example of a system according to Embodiment 1. As illustrated in FIG. 1, this system includes a microphone 30, a noise suppression device 35, a recognition device 40, a learning apparatus 100, and a voice correction apparatus 200. The microphone 30 is coupled to the noise suppression device 35.

The voice correction apparatus 200 is coupled to the noise suppression device 35, the recognition device 40, and the learning apparatus 100. Although not illustrated, the voice correction apparatus 200 may be coupled to the noise suppression device 35, the learning apparatus 100, and the recognition device 40 via a network. The microphone 30, the noise suppression device 35, the voice correction apparatus 200, and the recognition device 40 may be mounted on a vehicle or the like. The microphone 30, the noise suppression device 35, and the voice correction apparatus 200 may be mounted on a vehicle or the like, and the voice correction apparatus 200 may be coupled to the recognition device 40 and the learning apparatus 100 via a network.

The microphone 30 is a device which outputs a collected voice signal to the noise suppression device 35. The microphone 30 collects a voice signal in an environment in which noise is generated. For example, the microphone 30 is installed in a vehicle.

The noise suppression device 35 is a processing unit which performs noise suppression processing on the voice signal collected by the microphone 30. The noise suppression processing is a process corresponding to spectrum subtraction, a microphone array, or the like. The noise suppression device 35 outputs a voice signal (a noise suppressed signal) on which the noise suppression processing is performed, to the voice correction apparatus 200. In the following description, the voice signal on which the noise suppression processing is performed is referred to as "noise suppressed signal".

The recognition device 40 is a device which performs voice recognition on the voice signal output from the voice correction apparatus 200. As to be described below, the voice signal output from the voice correction apparatus 200 is a voice signal obtained by correcting the noise suppressed signal.

The learning apparatus 100 is an apparatus for machine learning of a model, based on a noise suppressed signal and a teaching signal prepared in advance. The teaching signal is a voice signal collected (recorded) by a microphone in an ideal environment where no noise is generated. The learning apparatus 100 notifies the voice correction apparatus 200 of information on the machine-learned model.

The learning apparatus 100 performs the following processes in a case where machine learning is performed on a model. The learning apparatus 100 emphasizes a component of a band corresponding to a band having a low SNR of a noise suppressed signal among all bands of a teaching signal. In the following description, the emphasized teaching signal is referred to as "emphasized signal". In Embodiment 1, the learning apparatus 100 generates an emphasized signal by multiplying power corresponding to a band having the power less than a threshold value among the bands of the teaching signal by a gain exceeding 1.

The learning apparatus 100 performs machine learning on a model corrected so that a shape of a power spectrum of a noise suppressed signal approaches a shape of a power spectrum of the emphasized signal. Since a difference between the shape of the power spectrum of the noise suppressed signal and the shape of the power spectrum of the emphasized signal is larger in the band having a low SNR (a band having low power of a power spectrum) according to the emphasis described above, in the model learned by machine learning of the learning apparatus 100, correction by weighting of giving priority to the band having the low SNR is performed.

The voice correction apparatus 200 is an apparatus which corrects a noise suppressed signal by using the model learned by the learning apparatus 100. The voice correction apparatus 200 outputs the corrected noise suppressed signal to the recognition device 40.

As described above, in the model learned by the learning apparatus 100, correction by weighting of giving priority to a band having a low SNR is performed. For this reason, it is possible to perform correction corresponding to distortion included in a band having a low SNR included in a noise suppressed signal, and accordingly it is possible to improve recognition accuracy of a voice signal on which noise suppression processing is performed in an environment in which noise is generated.

Next, a functional configuration of the learning apparatus 100 illustrated FIG. 1 will be described. FIG. 2 is a functional block diagram illustrating a configuration of a learning apparatus according to Embodiment 1. As illustrated in FIG. 2, the learning apparatus 100 includes a storage unit 110, windowing units 120a and 120b, FFT processing units 130a and 130b, power spectrum calculation units 140a and 140b, an emphasis unit 145, a learning unit 150, and a notification unit 160.

Each processing unit (120a, 120b, 130a, 130b, 140a, 140b, 145, 150, and 160) is implemented as a result of a program stored in the learning apparatus 100 being executed by a central processing unit (CPU), a microprocessor unit (MPU), or the like by using a random-access memory (RAM) or the like as a workspace, for example. Each processing unit may also be implemented by an integrated circuit such as an application specific integrated circuit (ASIC) or a field-programmable gate array (FPGA), for example.

The storage unit 110 includes a noise suppressed signal database 110a, a teaching signal database 110b, and learning model information 110c. The storage unit 110 corresponds to a semiconductor memory device such as a random-access memory (RAM), a read-only memory (ROM), a flash memory, or a storage device such as a hard disk drive (HDD).

The noise suppressed signal database 110a is a database in which a noise suppressed signal is stored. Such a noise suppressed signal is a signal obtained by performing noise suppression processing on a voice signal recorded in a noise environment.

The teaching signal database 110b is a database in which a teaching signal is stored. Such a teaching signal is a voice signal recorded in an ideal environment in which no noise is generated.

The learning model information 110c is a model learned by the learning unit 150. For example, a model learned by the learning unit 150 is a neural network. The neural network includes an input layer, a hidden layer, and an output layer, and a plurality of nodes are coupled by edges in each layer. Each layer has a function referred to as an activation function, the edge has a weight.

The windowing unit 120a is a processing unit which obtains a noise suppressed signal from the noise suppressed signal database 110a and performs windowing. For example, the windowing unit 120a performs windowing by overlapping time window such as Hanning window by 50%.

The windowing unit 120a outputs the noise suppressed signal on which the windowing is performed to the FFT processing unit 130a.

The windowing unit 120b is a processing unit which obtains a teaching signal from the teaching signal database 110b and performs windowing. For example, the windowing unit 120b performs windowing by overlapping time window such as Hanning window by 50%. The windowing unit 120b outputs the teaching signal on which the windowing is performed to the FFT processing unit 130b.

The FFT processing unit 130a is a processing unit which extracts a component for each frequency of a noise suppressed signal by performing FFT on the noise suppressed signal corresponding to the time window set by the windowing unit 120a. The FFT processing unit 130a outputs information on the component for each frequency of the noise suppressed signal to the power spectrum calculation unit 140a.

The FFT processing unit 130b is a processing unit which extracts a component for each frequency of a teaching signal by performing FFT on the teaching signal corresponding to the time window set by the windowing unit 120b. The FFT processing unit 130b outputs information on the component for each frequency of the teaching signal to the power spectrum calculation unit 140b.

The power spectrum calculation unit 140a is a processing unit which calculates a power spectrum for each frequency based on the component for each frequency of the noise suppressed signal. The power spectrum calculation unit 140a outputs power information for each frequency of the noise suppressed signal to the learning unit 150. In the following description, power information for each frequency of the noise suppressed signal is referred to as "noise suppressed power spectrum".

The power spectrum calculation unit 140b is a processing unit which calculates power for each frequency based on the component for each frequency of the teaching signal. The power spectrum calculation unit 140b outputs power information for each frequency of the teaching signal to the emphasis unit 145. In the fallowing description, power information for each frequency of the teaching signal is referred to as "teaching power spectrum".

The emphasis unit 145 emphasizes a component of a band corresponding to a band having a low SNR of a noise suppressed signal among all bands of a teaching signal. The band having the low SNR of the noise suppressed signal corresponds to a band having low power of a power spectrum. The emphasis unit 145 multiplies a teaching power spectrum by a gain corresponding to power of a power spectrum illustrated in FIG. 3 so as to perform emphasis.

Figure 3:
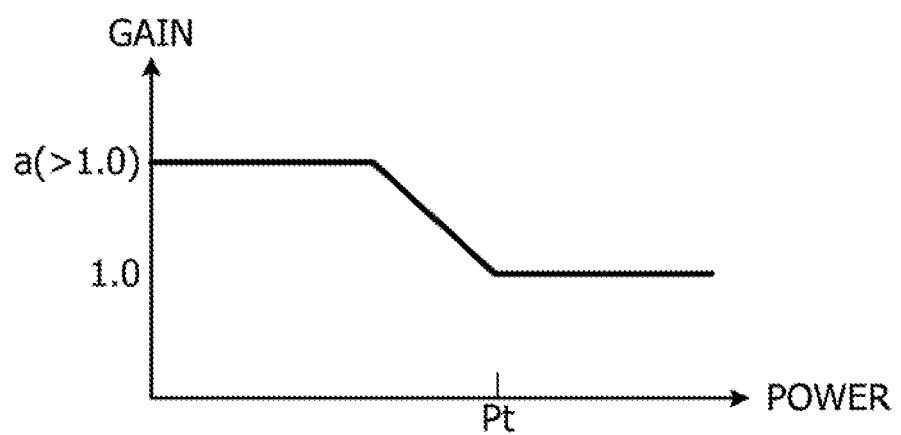
FIG. 3 is a diagram illustrating a relationship between power and a gain of a power spectrum.

FIG. 3 is a diagram illustrating a relationship between power and a gain of a power spectrum. The horizontal axis of the graph illustrated in FIG. 3 is an axis corresponding to power for each frequency of the power spectrum. The vertical axis of the graph is an axis corresponding to the gain. As illustrated in FIG. 3, among bands of the power spectrum, a band having power equal to or higher than Pt is multiplied by gain=1. Among the bands of the power spectrum, a band having power less than Pt is multiplied by a gain exceeding 1 (maximum a). a is a value set in advance.

Figure 4:
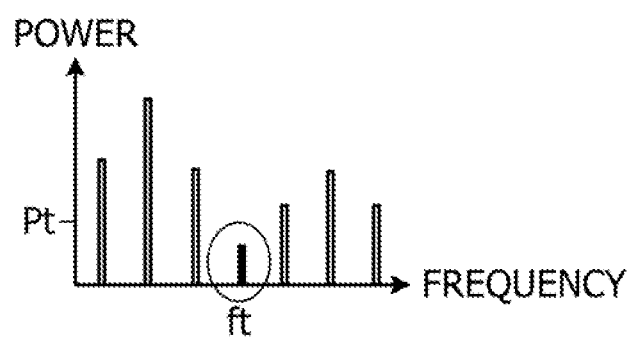
FIG. 4 is a diagram for explaining a process of an emphasis unit according to Embodiment 1.

FIG. 4 is a diagram for explaining a process of an emphasis unit according to Embodiment 1. The graph illustrated in FIG. 4 is an example of a teaching power spectrum. The horizontal axis of the graph is an axis corresponding to a frequency. The vertical axis of the graph is an axis corresponding to power. In the example illustrated in FIG. 4, the power is less than Pt in a band ft. For this reason, the emphasis unit 145 emphasizes a teaching power spectrum by multiplying power corresponding to the band ft by a gain (a gain exceeding 1) based on the graph illustrated in FIG. 3.

For the other bands, since power is equal to or higher than Pt, the gain to be multiplied is 1 and the emphasis is not performed. In the following description, information on the teaching power spectrum after the process of the emphasis unit 145 is referred to as "emphasized power spectrum". The emphasis unit 145 outputs the emphasized power spectrum to the learning unit 150.

Figure 2:
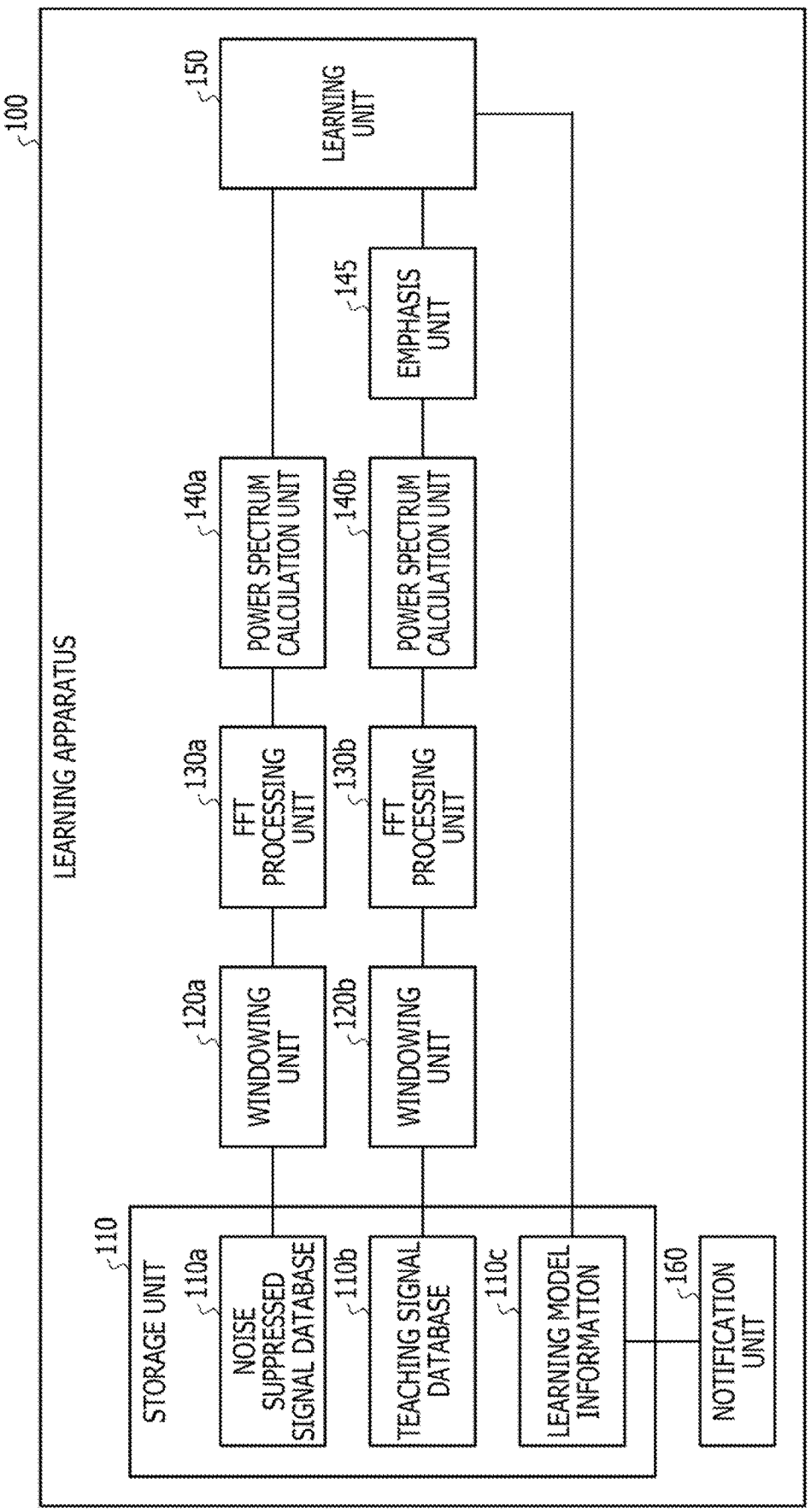
FIG. 2 is a functional block diagram illustrating a configuration of a learning apparatus according to Embodiment 1.

Returning to the description in FIG. 2. The windowing units 120a and 120b, the FFT processing units 130a and 130b, the power spectrum calculation units 140a and 140b, the emphasis unit 145 of the learning apparatus 100 repeatedly execute the processes described above, a plurality of sets of a noise suppressed power spectrum and an emphasized power spectrum are output to the learning unit 150.

The learning unit 150 is a processing unit which performs machine learning on a model corrected so that a shape of the noise suppressed power spectrum approaches a shape of the emphasized power spectrum, based on the plurality of sets of the noise suppressed power spectrum and the emphasized power spectrum. The learning unit 150 stores information on the machine-learned model as learning model information 110c in the storage unit 110.

For example, the learning unit 150 inputs power ($P1(f_0)$, $P1(f_1)$, $P1(f_2)$, . . . , and $P1(f_n)$) for each frequency of the noise suppressed power spectrum to an input layer of a neural network (NN), In this case, output power of each frequency from an output layer of the NN is ($P1'(f_0)$, $P1'(f_1)$, $P1'(f_2)$, . . . , and $P1'(f_n)$).

The learning unit 150 adjusts a weight of the NN so that an evaluation function based on a difference between ($P1'(f_0)$, $P1'(f_1)$, $P1'(f_2)$, . . . , and $P1'(f_n)$) and power ($P3(f_0)$, $P3(f_1)$, $P3(f_2)$, . . . , and $P3(f_n)$) for each frequency of the emphasized power spectrum approaches zero. By repeatedly performing the processes described above, based on the plurality of sets of the noise suppressed power spectrum and the emphasized power spectrum, the learning unit 150 learns the weight of the NN.

A difference between a shape of the power spectrum of the noise suppressed signal and a shape of the emphasized power spectrum is larger in the band having a low SNR (a band having low power of a power spectrum) according to the emphasis by the emphasis unit 145 described above. For this reason, when correction using the model learned by machine learning of the learning unit 150 is performed, correction by weighting of giving priority to a band having a low SNR is performed.

The notification unit 160 is a processing unit which notifies the voice correction apparatus 200 of the learning model information 110c.

Figure 5:
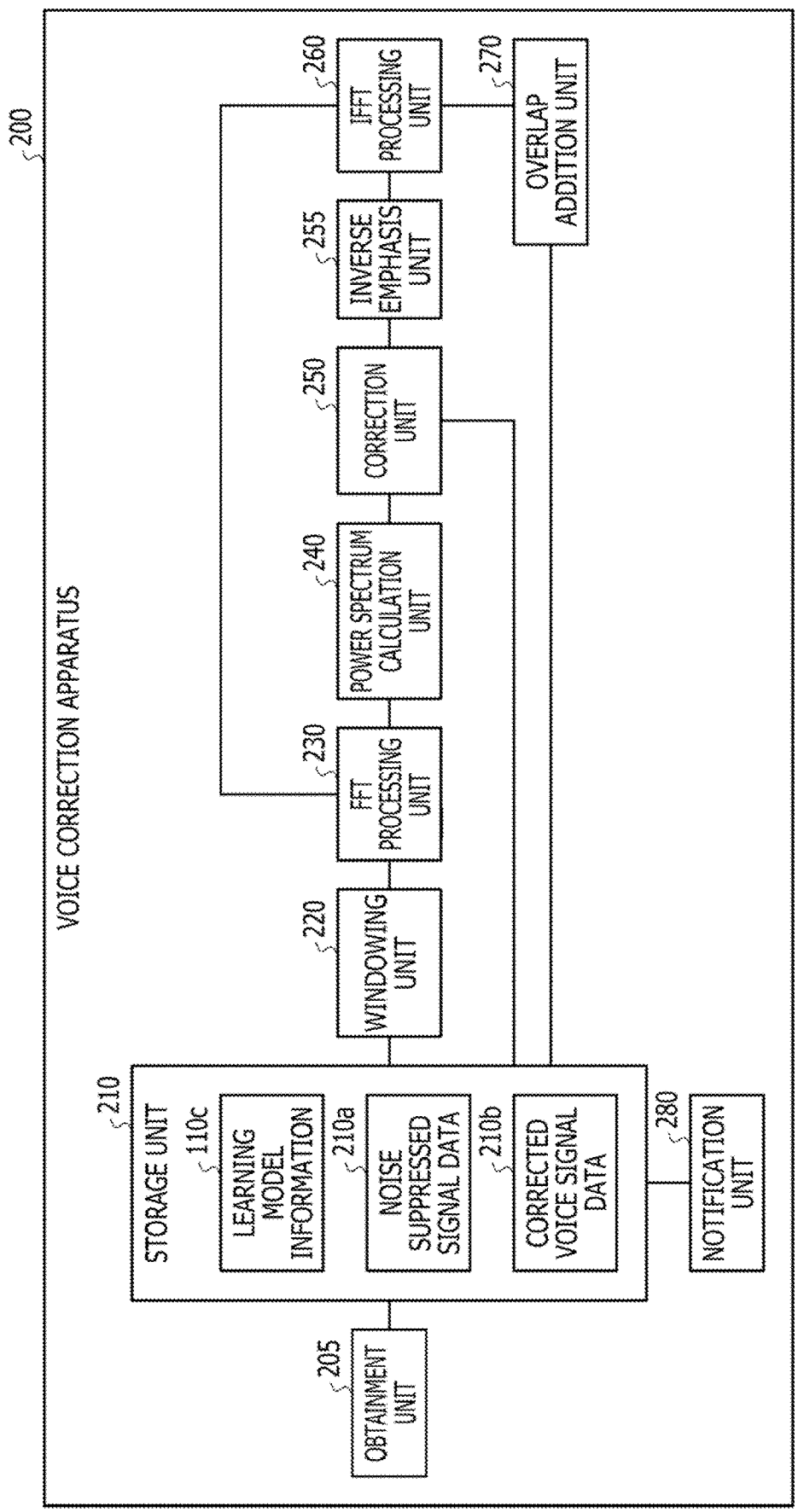
FIG. 5 is a functional block diagram illustrating a configuration of a voice correction apparatus according to Embodiment 1.

Next, an example of a configuration of the voice correction apparatus 200 illustrated FIG. 1 will be described. FIG. 5 is a functional block diagram illustrating a configuration of a voice correction apparatus according to Embodiment 1. As illustrated in FIG. 5, the voice correction apparatus 200 includes an obtainment unit 205, a storage unit 210, a windowing unit 220, an FFT processing unit 230, a power spectrum calculation unit 240, a correction unit 250, an inverse emphasis unit 255, and an IFFT processing unit 260, an overlap addition unit 270, and a communication unit 280.

Each processing unit (205, 220, 230, 240, 250, 255, 260, 270, and 280) is implemented as a result of a program stored in the voice correction apparatus 200 being executed by a CPU, a MPU, or the like by using RAM as a workspace, for example. Each processing unit may also be implemented by an integrated circuit such as an ASIC or an FPGA, for example.

The obtainment unit 205 is a processing unit which obtains a noise suppressed signal from the noise suppression device 35. The obtainment unit 205 stores the noise suppressed signal in a noise suppressed signal data 210a of the storage unit 210.

The storage unit 210 includes the learning model information 110c, the noise suppressed signal data 210a, and a corrected voice signal data 210b. The storage unit 210 corresponds to a semiconductor memory element such as a RAM, a ROM, a flash memory, or a storage device such as an HDD.

The learning model information 110c is information on a learning model notified by the learning apparatus 100. A description related to the learning model information 110c is the same as the description related to the learning model information 110c illustrated in FIG. 2.

The noise suppressed signal data 210a is a data area in which a noise suppressed signal is stored. Such a noise suppressed signal is a signal obtained by performing noise suppression processing on a voice signal recorded in a noise environment.

The corrected voice signal data 210b is a data area in which a voice signal obtained by correcting a noise suppressed signal is stored. In the following description, the voice signal obtained by correcting the noise suppressed signal is referred to as "corrected voice signal".

The windowing unit 220 is a processing unit which obtains a noise suppressed signal from the noise suppressed signal data 210a and performs windowing. For example, the windowing unit 220 performs windowing by overlapping time window such as Harming window by 50%. The windowing unit 220 outputs the noise suppressed signal on which the windowing is performed to the FFT processing unit 230.

The FFT processing unit 230 is a processing unit which extracts a component for each frequency of a noise suppressed signal by performing FFT on the noise suppressed signal corresponding to the time window set by the windowing unit 220. The FFT processing unit 230 outputs information on the component for each frequency of the noise suppressed signal to the power spectrum calculation unit 240. The FFT processing unit 230 outputs information on a spectrum when FFT is performed to the IFFT processing unit 260.

The power spectrum calculation unit 240 is a processing unit which calculates a power spectrum (a noise suppressed power spectrum) for each frequency based on the component for each frequency of the noise suppressed signal. The power spectrum calculation unit 240 outputs the noise suppressed power spectrum to the correction unit 250.

The correction unit 250 is a processing unit which corrects a shape of the noise suppressed power spectrum by using a model (NN) of the learning model information 110c learned by the learning apparatus 100. The correction unit 250 outputs the corrected noise suppressed power spectrum to the inverse emphasis unit 255.

The correction unit 250 inputs power for each frequency of the noise suppressed power spectrum to the input layer of the NN, and sets each power (power for each frequency) output from the output layer of the NN as the corrected noise suppressed power spectrum. When correction using the model of the learning model information 110c learned by the learning apparatus 100 is performed, correction by weighting of giving priority to a band having a low SNR (a band having low power) is performed. In the following description, the corrected noise suppressed power spectrum is referred to as "corrected power spectrum".

By using a gain according to power of a power spectrum illustrated in FIG. 3, the inverse emphasis unit 255 divides a corrected power spectrum so as to weaken (inverse-emphasize) power of a band corresponding to a band having a low SNR of a noise suppressed signal among bands of the corrected power spectrum.

Figure 6:
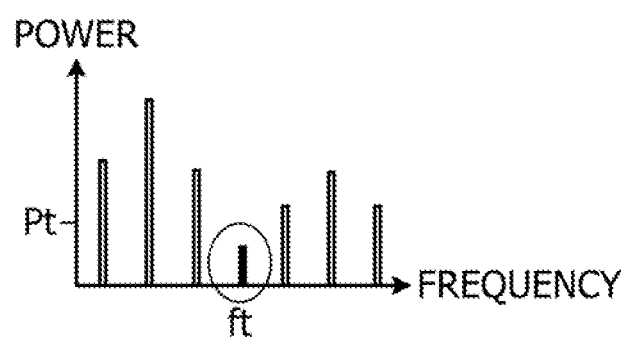
FIG. 6 is a diagram for explaining a process of an inverse emphasis unit according to Embodiment 1.

FIG. 6 is a diagram for explaining a process of an inverse emphasis unit according to Embodiment 1. The graph illustrated in FIG. 6 is an example of a corrected power spectrum. The horizontal axis of the graph is an axis corresponding to a frequency. The vertical axis of the graph is an axis corresponding to power. In the example illustrated in FIG. 6, the power is less than Pt in a band ft. For this reason, the inverse emphasis unit 255 weakens a teaching power spectrum by dividing power corresponding to the band ft by a gain (a gain exceeding 1) based on the graph illustrated in FIG. 3. For the other bands, since power is equal to or higher than Pt, the gain used for division is 1 and there is no change.

In the following description, the corrected power spectrum processed by the inverse emphasis unit 255 is simply referred to as "corrected power spectrum". The inverse emphasis unit 255 outputs the corrected power spectrum to the IFFT processing unit 260.

The IFFT processing unit 260 is a processing unit which corrects power of a spectrum from the FFT processing unit 230 by using a ratio of a power spectrum before correction calculated in the IFFT processing unit 260 to the corrected power spectrum from the inverse emphasis unit 255 and performs inverse Fourier transform so as to convert the corrected power spectrum into a voice signal indicating a relationship between a time and an amplitude. When the IFFT processing unit 260 performs inverse Fourier transform, information on a spectrum notified from the FFT processing unit 230 is used. The IFFT processing unit 260 outputs the voice signal on which inverse Fourier transform is performed to the overlap addition unit 270.

The overlap addition unit 270 is a processing unit which adds each voice signal output from the IFFT processing unit 260 with 50% overlap. The overlap addition unit 270 stores the overlap-added voice signal (the corrected noise suppressed signal) in the corrected voice signal data 210b.

The communication unit 280 is a processing unit which performs data communication between the learning apparatus 100 and the recognition device 40. For example, in a case of receiving a notification of the learning model information 110c from the learning apparatus 100, the communication unit 280 stores the received learning model information 110c in the storage unit 210. The communication unit 280 transmits the noise suppressed signal stored in the corrected voice signal data 210b to the recognition device 40.

Figure 7:
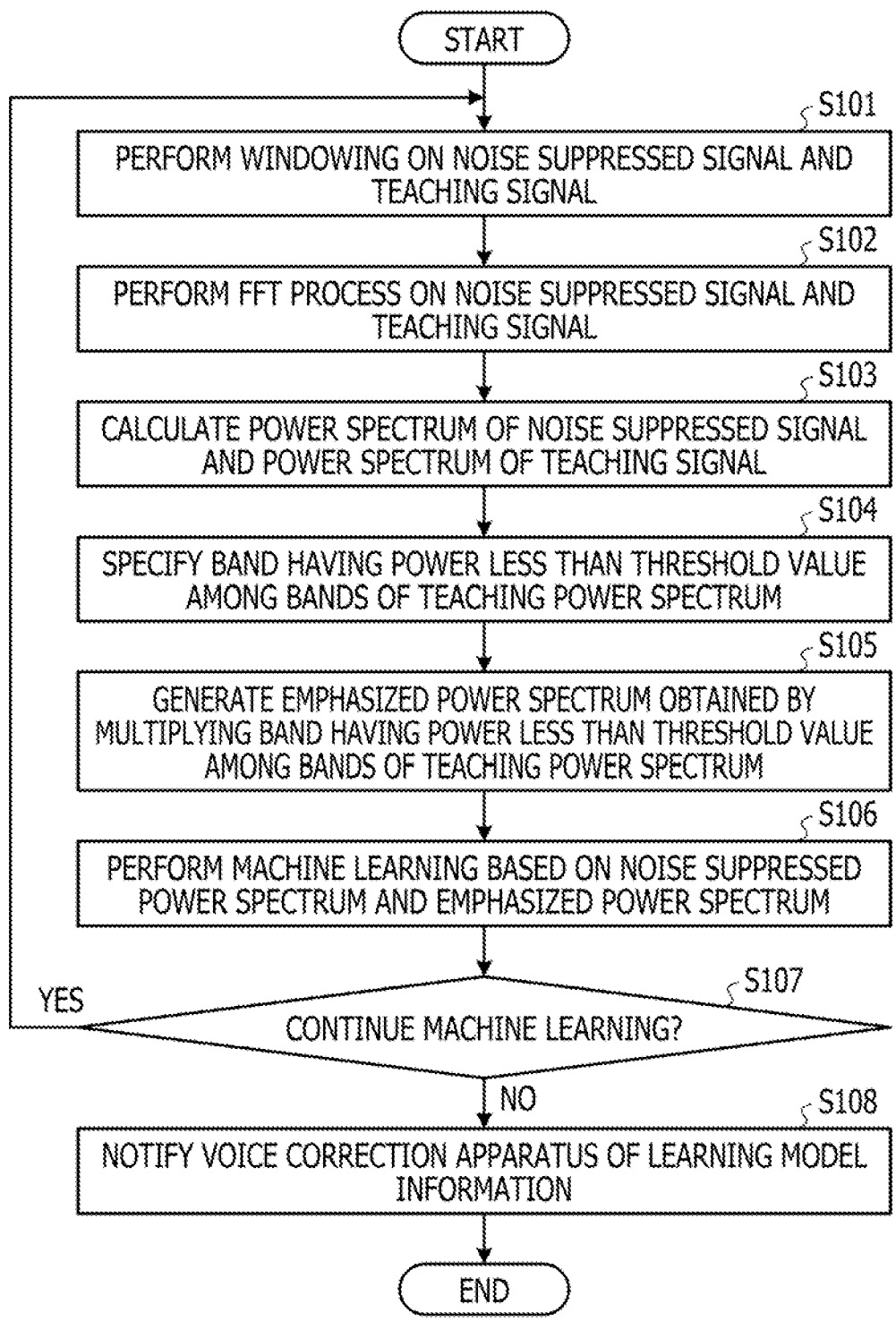
FIG. 7 is a flowchart illustrating a process procedure of the learning apparatus according to Embodiment 1.

Next, an example of a process procedure of the learning apparatus 100 according to Embodiment 1 will be described. FIG. 7 is a flowchart illustrating a process procedure of a learning apparatus according to Embodiment 1. As illustrated in FIG. 7, the windowing unit 120a of the learning apparatus 100 performs windowing on a noise suppressed signal. The windowing unit 120b of the learning apparatus 100 performs windowing on a teaching signal (step S101).

The FFT processing unit 130a of the learning apparatus 100 performs a FFT process on the noise suppressed signal on which the windowing is performed. The FFT processing unit 130b of the learning apparatus 100 performs the FFT process on the teaching signal on which the windowing is performed (step S102).

The power spectrum calculation unit 140a of the learning apparatus 100 calculates a power spectrum (a noise suppressed power spectrum) of the noise suppressed signal after the FFT process. The power spectrum calculation unit 140b of the learning apparatus 100 calculates a power spectrum (a teaching power spectrum) of the teaching signal after the FFT process (step S103).

The emphasis unit 145 of the learning apparatus 100 specifies a band having power less than a threshold value among bands of the teaching power spectrum (step S104). For example, the band having power less than the threshold value corresponds to a band having a low SNR of the noise suppressed signal. The emphasis unit 145 generates an emphasized power spectrum obtained by multiplying the band having the power less than the threshold value among the bands of the teaching power spectrum by a gain exceeding 1 (step S105).

The learning unit 150 performs machine learning based on the noise suppressed power spectrum and the emphasized power spectrum (step S106). In a case of continuing machine learning (Yes in step S107), the learning apparatus 100 proceeds to step S101. On the other hand, in a case of not continuing machine learning (No in step S107), the learning apparatus 100 proceeds to step S108. The notification unit 160 of the learning apparatus 100 notifies the voice correction apparatus 200 of the learning model information 110c (step S108).

Figure 8:
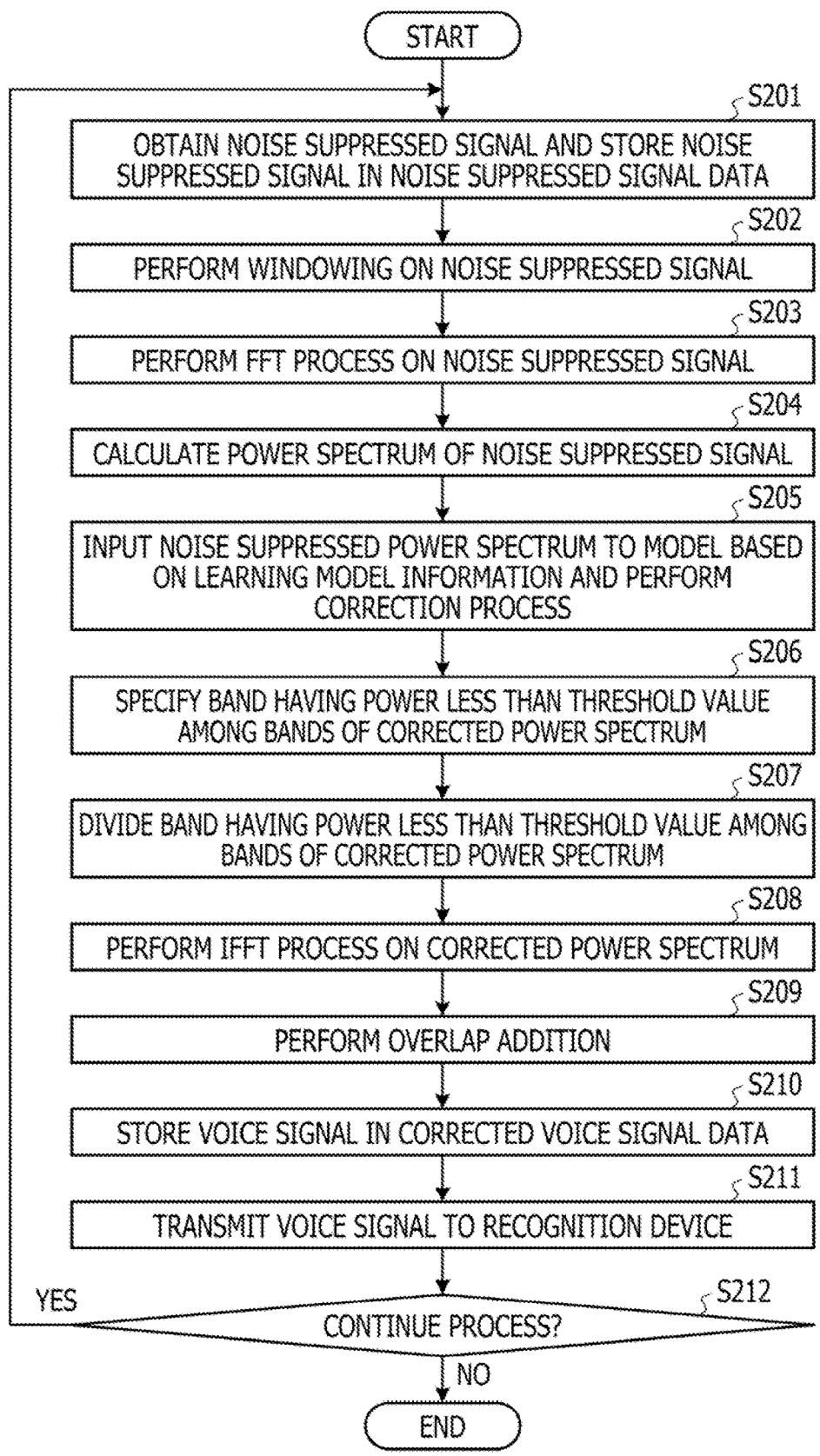
FIG. 8 is a flowchart illustrating a process procedure of the voice correction apparatus according to Embodiment 1.

Next, an example of a process procedure of the voice correction apparatus 200 according to Embodiment 1 will be described. FIG. 8 is a flowchart illustrating a process procedure of a voice correction apparatus according to Embodiment 1. As illustrated in FIG. 8, the obtainment unit 205 of the voice correction apparatus 200 obtains a noise suppressed signal from the noise suppression device 35 and stores the noise suppressed signal in the noise suppressed signal data 210a (step S201).

The windowing unit 220 of the voice correction apparatus 200 performs windowing on the noise suppressed signal (step S202). The FFT processing unit 230 of the voice correction apparatus 200 performs the FFT process on the noise suppressed signal on which the windowing is performed (step S203).

The power spectrum calculation unit 240 of the voice correction apparatus 200 calculates a power spectrum (a noise suppressed power spectrum) of the noise suppressed signal after the FFT process (step S204). The correction unit 250 of the voice correction apparatus 200 inputs the noise suppressed power spectrum to a model based on the learning model information 110c, and performs a correction process (step S205).

The inverse emphasis unit 255 of the voice correction apparatus 200 specifies a band having power less than a threshold value among bands of the corrected power spectrum (step S206). The inverse emphasis unit 255 divides the band having the power less than the threshold value among the bands of the corrected power spectrum by a gain exceeding 1 (step S207).

The IFFT processing unit 260 of the voice correction apparatus 200 performs an IFFT process by correcting the power of the spectrum as a result in step S203 with the power of the corrected power spectrum (step S208). The overlap addition unit 270 of the voice correction apparatus 200 performs overlap addition (step S209). The overlap addition unit 270 stores the overlap-added voice signal in the corrected voice signal data 210b (step S210).

The communication unit 280 of the voice correction apparatus 200 transmits the voice signal of the corrected voice signal data 210b to the recognition device 40 (step S211). In a case of continuing the process (Yes in step S212), the voice correction apparatus 200 proceeds to step S201. In a case of not continuing the process (No in step S212), the voice correction apparatus 200 terminates the process.

Next, an effect of the learning apparatus 100 and the voice correction apparatus 200 according to Embodiment 1 will be described. The learning apparatus 100 emphasizes a component of a band corresponding to a band having a low SNR of a noise suppressed signal among all bands of a teaching power spectrum so as to generate an emphasized power spectrum. The learning apparatus 100 performs machine learning on a model corrected so that a shape of a noise suppressed power spectrum approaches a shape of the emphasized power spectrum. Since a difference between the shape of the power spectrum of the noise suppressed signal and the shape of the power spectrum of the emphasized signal is larger in the band having a low SNR (a band having low power of a power spectrum) according to the emphasis process, in the model learned by machine learning of the learning apparatus 100, correction by weighting of giving priority to the band having the low SNR is performed.

Based on the model (learning model information) learned by the learning apparatus 100, the voice correction apparatus 200 may correct distortion generated in a band having a low SNR by correcting a noise suppressed signal. According to the correction, it is possible to increase recognition accuracy of a voice signal on which the noise suppression processing is performed in an environment in which noise is generated.

In a case of emphasizing a teaching signal, the learning apparatus 100 multiplies power of a band having the power less than a threshold value among bands of a teaching power spectrum by a gain exceeding 1. Accordingly, it is possible to emphasize a component of the band corresponding to the band having the low SNR of the noise suppressed signal.

The voice correction apparatus 200 divides power of the band having the power less than the threshold value among the bands of the corrected power spectrum corrected by the correction unit 250 by a gain exceeding 1. By performing such a process, it is possible to remove an effect by the emphasis process of the learning apparatus 100 from the corrected power spectrum after correcting distortion of the corrected power spectrum.

The inventor executes an experiment of a learning process and a correction process using a noise mixed voice (total 1920 utterances from 8 speakers) during idling as a teaching signal on a voice signal after noise suppression of a noise mixed voice (same total 1920 utterances from same 8 speakers) during high speed running (85 miles/h).

The degree of evaluation is evaluated by Equation (1). As a value of Equation (1) is large, it is indicated that an effect of correction is great.

$$10 \times \log_{10}\{(\text{power of teaching signal})/|\text{power of teaching signal} - \text{power of voice signal of correction result}|\} \text{dB} \quad (1)$$

As a result of the experiment, in the related art, the value of Equation (1) is 2.2 dB, and in the present embodiment, the value of Equation (1) is "9.5 dB". For example, according to the learning apparatus 100 and the voice correction apparatus 200 described in Embodiment 1, it is possible to increase recognition accuracy of a voice signal on which noise suppression processing is performed in an environment in which noise is generated.

Meanwhile, although the case where the learning apparatus 100 and the voice correction apparatus 200 described in Embodiment 1 are different apparatuses is described, the learning apparatus 100 and the voice correction apparatus 200 may be included in the same apparatus. For example, the voice correction apparatus 200 may include each data and each processing unit illustrated in FIG. 2, and may perform the same learning process as that of the learning apparatus 100 described above so as to generate the learning model information 110c.

In steps S104 and S105 in FIG. 7, the emphasis unit 145 of the learning apparatus 100 specifies a band having power less than a threshold value among bands of a teaching power spectrum, and multiplies the power of the specified band by a gain. However, the process of the emphasis unit 145 is not limited thereto. For example, the emphasis unit 145 may generate an emphasized power spectrum by multiplying power of each band of a teaching power spectrum by a gain corresponding to the power.

In steps S206 and S207 in FIG. 8, the inverse emphasis unit 255 of the voice correction apparatus 200 specifies a band having power less than a threshold value among bands of a corrected power spectrum, and divides the power of the specified band by a gain. However, the process of the inverse emphasis unit 255 is not limited thereto. For example, the inverse emphasis unit 255 may exclude an effect of an emphasis process by dividing power of each band of the corrected power spectrum by a gain corresponding to the power.

Embodiment 2

Figure 9:
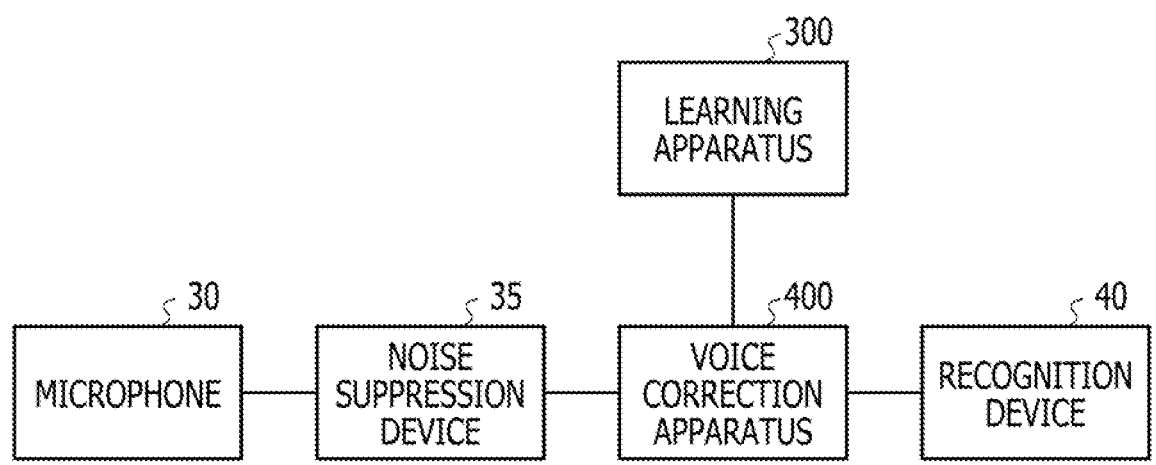
FIG. 9 is a diagram illustrating an example of a system according to Embodiment 2.

FIG. 9 is a diagram illustrating an example of a system according to Embodiment 2. As illustrated in FIG. 9, this system includes the microphone 30, the noise suppression device 35, the recognition device 40, a learning apparatus 300, and a voice correction apparatus 400. The microphone 30 is coupled to the noise suppression device 35.

The voice correction apparatus 400 is coupled to the noise suppression device 35, the recognition device 40, and the learning apparatus 300. Although not illustrated, the voice correction apparatus 400 may be coupled to the noise suppression device 35, the learning apparatus 300, and the recognition device 40 via a network. The microphone 30, the noise suppression device 35, the voice correction apparatus 400, and the recognition device 40 may be mounted on a vehicle or the like. The microphone 30, the noise suppression device 35, and the voice correction apparatus 400 may be mounted on a vehicle or the like, and the voice correction apparatus 400 may be coupled to the recognition device 40 and the learning apparatus 300 via a network.

Descriptions for the microphone 30, the noise suppression device 35, and the recognition device 40 are the same as the descriptions for the microphone 30, the noise suppression device 35, and the recognition device 40 illustrated in FIG. 1.

The learning apparatus 300 is an apparatus for machine learning of a model, based on a noise suppressed signal and a teaching signal prepared in advance. The learning apparatus 300 notifies the voice correction apparatus 400 of information on the machine-learned model.

The learning apparatus 300 performs the following processes in a case where machine learning is performed on a model. The learning apparatus 300 emphasizes a component of a band corresponding to a band having a low SNR of a noise suppressed signal among all bands of a teaching signal. In the following description, the emphasized teaching signal is referred to as "emphasized signal". In Embodiment 2, the learning apparatus 300 generates an emphasized signal by subtracting a power spectrum of a noise suppressed signal from a power spectrum of a teaching signal.

The learning apparatus 300 performs machine learning on a model corrected so that a shape of the power spectrum of the noise suppressed signal approaches a shape of a power spectrum of the emphasized signal, Since a difference between the shape of the power spectrum of the noise suppressed signal and the shape of the power spectrum of the emphasized signal is larger in the band having a low SNR (a band having low power of a power spectrum) according to the emphasis described above, in the model learned by machine learning of the learning apparatus 300, it is possible to increase the degree of correction for the band having the low SNR.

The voice correction apparatus 400 is an apparatus which corrects a noise suppressed signal by using the model learned by the learning apparatus 300. The voice correction apparatus 400 outputs the corrected noise suppressed signal to the recognition device 40.

As described above, in the model learned by the learning apparatus 300, weighting is performed so that large correction is applied to a band having a low SNR. For this reason, it is possible to perform correction corresponding to distortion included in a band having a low SNR included in a noise suppressed signal, and accordingly it is possible to improve recognition accuracy of a voice signal on which noise suppression processing is performed in an environment in which noise is generated.

Figure 10:
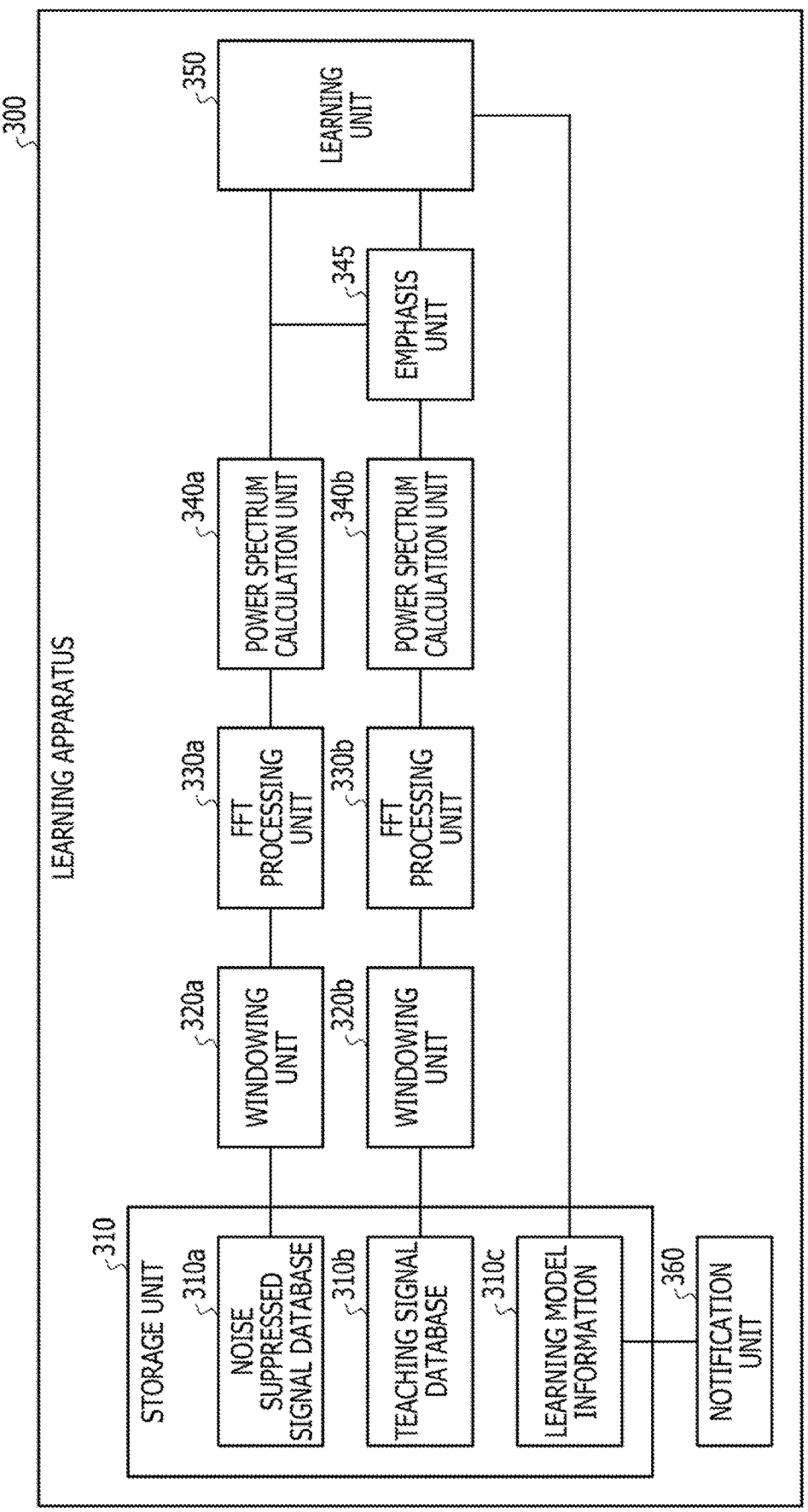
FIG. 10 is a functional block diagram illustrating a configuration of a learning apparatus according to Embodiment 2.

Next, a functional configuration of the learning apparatus 300 illustrated FIG. 9 will be described. FIG. 10 is a functional block diagram illustrating a configuration of a learning apparatus according to Embodiment 2. As illustrated in FIG. 10, the learning apparatus 300 includes a storage unit 310, windowing units 320a and 320b, FFT processing units 330a and 330b, power spectrum calculation units 340a and 340b, an emphasis unit 345, a learning unit 350, and a notification unit 360.

Each processing unit (320a, 320b, 330a, 330b, 340a, 340b, 345, 350, and 360) is implemented as a result of a program stored in the learning apparatus 300 being executed by a CPU, a MPU, or the like by using RAM as a workspace, for example. Each processing unit may also be implemented by an integrated circuit such as an ASIC or an FPGA, for example.

The storage unit 310 includes a noise suppressed signal database 310a, a teaching signal database 310b, and learning model information 310c. The storage unit 310 corresponds to a semiconductor memory element such as a RAM, a ROM, a flash memory, or a storage device such as an HDD.

The noise suppressed signal database 310a is a database in which a noise suppressed signal is stored. Such a noise suppressed signal is a signal obtained by performing noise suppression processing on a voice signal recorded in a noise environment.

The teaching signal database 310b is a database in which a teaching signal is stored. Such a teaching signal is a voice signal recorded in an ideal environment in which no noise is generated.

The learning model information 310c is a model learned by the learning unit 350. For example, a model learned by the learning unit 350 is a neural network. The neural network includes an input layer, a hidden layer, and an output layer, and a plurality of nodes are coupled by edges in each layer. Each layer has a function referred to as an activation function, the edge has a weight.

The windowing unit 320a is a processing unit which obtains a noise suppressed signal from the noise suppressed signal database 310a and performs windowing. For example, the windowing unit 320a performs windowing by overlapping time window such as Hanning window by 50%. The windowing unit 320a outputs the noise suppressed signal on which the windowing is performed to the FFT processing unit 330a.

The windowing unit 320b is a processing unit which obtains a teaching signal from the teaching signal database 310b and performs windowing. For example, the windowing unit 320b performs windowing by overlapping time window such as Hanning window by 50%. The windowing unit 320b outputs the teaching signal on which the windowing is performed to the FFT processing unit 330b.

The FFT processing unit 330a is a processing unit which extracts a component for each frequency of a noise suppressed signal by performing FFT on the noise suppressed signal corresponding to the time window set by the windowing unit 320a. The FFT processing unit 330a outputs information on the component for each frequency of the noise suppressed signal to the power spectrum calculation unit 340a.

The FFT processing unit 330b is a processing unit which extracts a component for each frequency of a teaching signal by performing FFT on the teaching signal corresponding to the time window set by the windowing unit 320b. The FFT processing unit 330b outputs information on the component for each frequency of the teaching signal to the power spectrum calculation unit 340b.

The power spectrum calculation unit 340a is a processing unit which calculates a power spectrum for each frequency based on the component for each frequency of the noise suppressed signal. The power spectrum calculation unit 340a outputs power information for each frequency of the noise suppressed signal to the emphasis unit 345 and the learning unit 350. In the following description, power information for each frequency of the noise suppressed signal is referred to as "noise suppressed power spectrum".

The power spectrum calculation unit 340b is a processing unit which calculates power for each frequency based on the component for each frequency of the teaching signal. The power spectrum calculation unit 340b outputs power information for each frequency of the teaching signal to the emphasis unit 345. In the following description, power information for each frequency of the teaching signal is referred to as "teaching power spectrum".

The emphasis unit 345 emphasizes a component of a band corresponding to a band having a low SNR of a noise suppressed signal among all bands of a teaching signal. The band having the low SNR of the noise suppressed signal corresponds to a band having low power of a power spectrum. For example, the emphasis unit 345 generates an "emphasized power spectrum" by subtracting a noise suppressed power spectrum from a teaching power spectrum. The emphasis unit 345 outputs information on the emphasized power spectrum to the learning unit 350.

Figure 11:
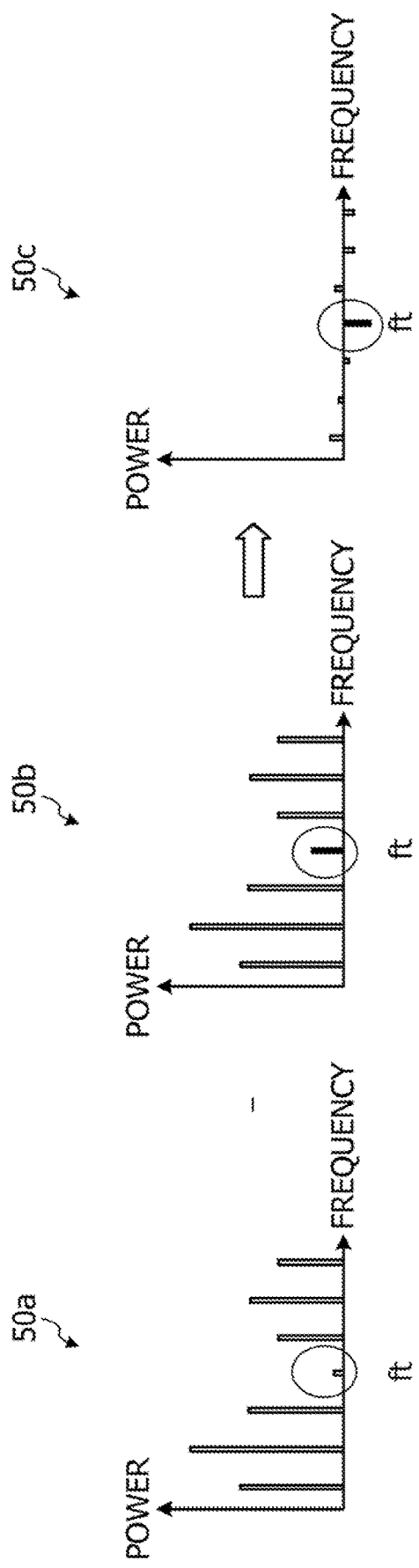
FIG. 11 is a diagram for explaining a process of an emphasis unit according to Embodiment 2.

FIG. 11 is a diagram for explaining a process of an emphasis unit according to Embodiment 2. FIG. 11 illustrates a teaching power spectrum 50a, a noise suppressed power spectrum 50b, and an emphasized power spectrum 50c. The horizontal axis of each power spectrum 50a, 50b, and 50c is an axis corresponding to a frequency, and the vertical axis is an axis corresponding to power. A band having a low SNR of a noise suppressed signal is a band having low power, for example, a frequency ft. The emphasis unit 345 generates the emphasized power spectrum 50c by subtracting the noise suppressed power spectrum 50b from the teaching power spectrum 50a. In the emphasized power spectrum 50c, power of a frequency corresponding to a band having a low SNR of a noise suppressed signal is emphasized.

Returning to the description in FIG. 10. The windowing units 320a and 320b, the FFT processing units 330a and 330b, the power spectrum calculation units 340a and 340b, the emphasis unit 345 of the learning apparatus 300 repeatedly execute the processes described above, a plurality of sets of a noise suppressed power spectrum and an emphasized power spectrum are output to the learning unit 350.

The learning unit 350 is a processing unit which performs machine learning on a model corrected so that a shape of the noise suppressed power spectrum approaches a shape of the emphasized power spectrum, based on the plurality of sets of the noise suppressed power spectrum and the emphasized power spectrum. The learning unit 350 stores information on the machine-learned model as learning model information 310c in the storage unit 310. Based on the plurality of sets of the noise suppressed power spectrum and the emphasized power spectrum, the process performed by machine learning of the learning unit 350 is the same as machine learning of the learning unit 150 described in Embodiment 1.

The notification unit 360 is a processing unit which notifies the voice correction apparatus 400 of the learning model information 310c.

Figure 12:
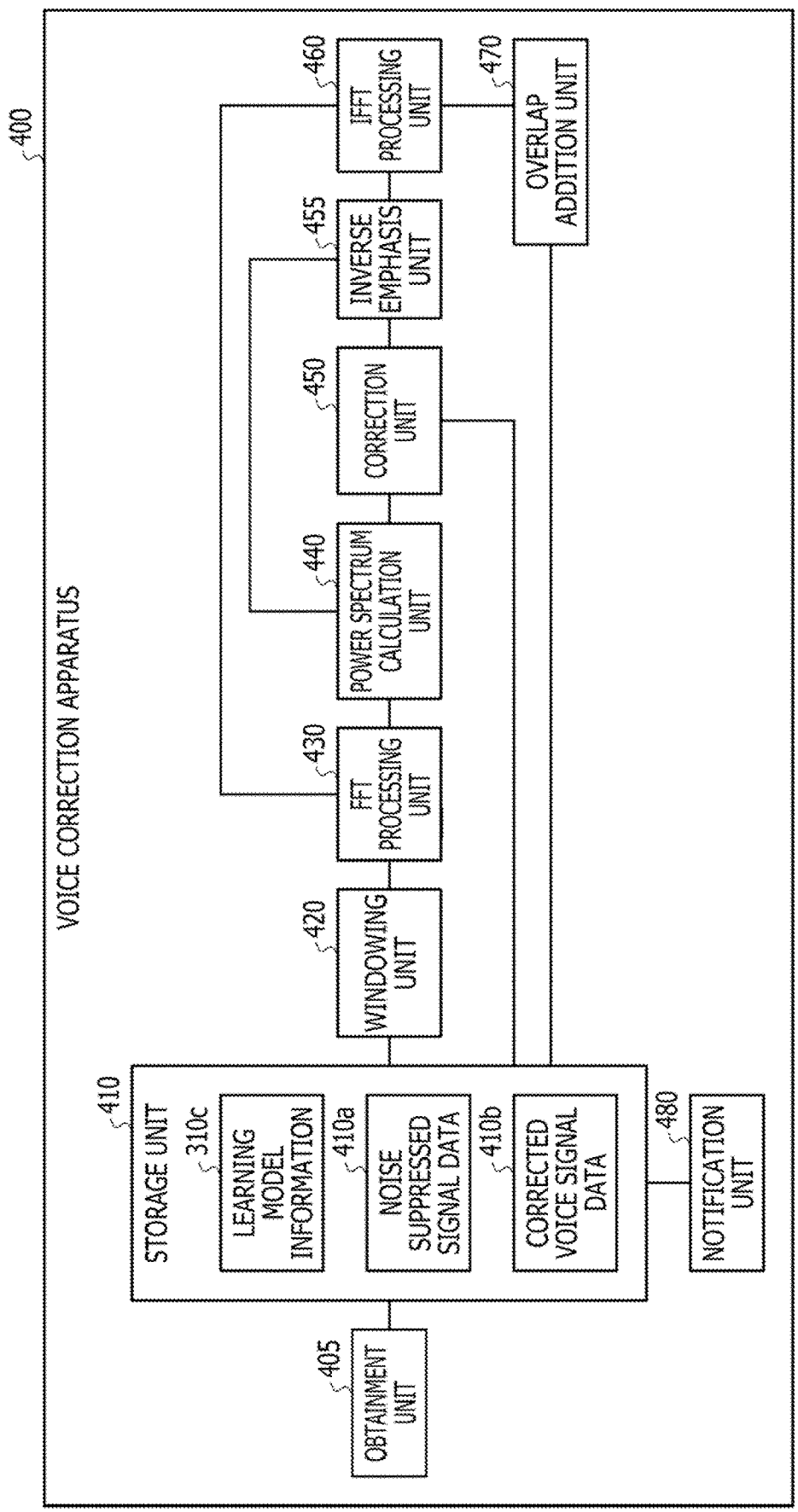
FIG. 12 is a functional block diagram illustrating a configuration of a voice correction apparatus according to Embodiment 2.

Next, an example of a configuration of the voice correction apparatus 400 illustrated FIG. 9 will be described. FIG. 12 is a functional block diagram illustrating a configuration of a voice correction apparatus according to Embodiment 2. As illustrated in FIG. 12, the voice correction apparatus 400 includes an obtainment unit 405, a storage unit 410, a windowing unit 420, an FFT processing unit 430, a power spectrum calculation unit 440, a correction unit 450, an inverse emphasis unit 455, and an IFFT processing unit 460, an overlap addition unit 470, and a communication unit 480.

Each processing unit (405, 420, 430, 440, 450, 455, 460, 470, and 480) is implemented as a result of a program stored in the voice correction apparatus 400 being executed by a CPU, a MPU, or the like by using RAM as a workspace, for example. Each processing unit may also be implemented by an integrated circuit such as an ASIC or an FPGA, for example.

The obtainment unit 405 is a processing unit which obtains a noise suppressed signal from the noise suppression device 35. The obtainment unit 405 stores the noise suppressed signal in a noise suppressed signal data 410a of the storage unit 410.

The storage unit 410 includes the learning model information 310c, the noise suppressed signal data 410a, and a corrected voice signal data 410b. The storage unit 410 corresponds to a semiconductor memory element such as a RAM, a ROM, a flash memory, or a storage device such as an HDD.

The learning model information 310c is information on a learning model notified by the learning apparatus 300. A description related to the learning model information 310c is the same as the description related to the learning model information 310c illustrated in FIG. 10.

The noise suppressed signal data 410a is a data area in which a noise suppressed signal is stored. Such a noise suppressed signal is a signal obtained by performing noise suppression processing on a voice signal recorded in a noise environment.

The corrected voice signal data 410b is a data area in which a voice signal obtained by correcting a noise suppressed signal is stored. In the following description, the voice signal obtained by correcting the noise suppressed signal is referred to as "corrected voice signal".

The windowing unit 420 is a processing unit which obtains a noise suppressed signal from the noise suppressed signal data 410a and performs windowing. For example, the windowing unit 420 performs windowing by overlapping time window such as Hanning window by 50%. The windowing unit 420 outputs the noise suppressed signal on which the windowing is performed to the FFT processing unit 430.

The FFT processing unit 430 is a processing unit which extracts a component for each frequency of a noise suppressed signal by performing FFT on the noise suppressed signal corresponding to the time window set by the windowing unit 420. The FFT processing unit 430 outputs information on the component for each frequency of the noise suppressed signal to the power spectrum calculation unit 440. The FFT processing unit 430 outputs information on a spectrum when FFT is performed to the IFFT processing unit 460.

The power spectrum calculation unit 440 is a processing unit which calculates a power spectrum (a noise suppressed power spectrum) for each frequency based on the component for each frequency of the noise suppressed signal. The power spectrum calculation unit 440 outputs the noise suppressed power spectrum to the correction unit 450 and the inverse emphasis unit 455.

The correction unit 450 is a processing unit which corrects a shape of the noise suppressed power spectrum by using a model (NN) of the learning model information 310c learned by the learning apparatus 300. The correction unit 450 outputs the corrected noise suppressed power spectrum to the inverse emphasis unit 455.

The correction unit 450 inputs power for each frequency of the noise suppressed power spectrum to the input layer of the NN, and sets each power (power for each frequency) output from the output layer of the NN as the corrected noise suppressed power spectrum. When correction using the model of the learning model information 310c learned by the learning apparatus 300 is performed, the degree of correction for a band having a low SNR is increased. In the following description, the corrected noise suppressed power spectrum is referred to as "corrected power spectrum".

The inverse emphasis unit 455 processes the correction by the correction unit 450, and then adds a noise suppressed power spectrum to the corrected power spectrum, so as to remove an effect (a subtraction effect) of the process by the emphasis unit 345 of the learning apparatus 300.

Figure 13:
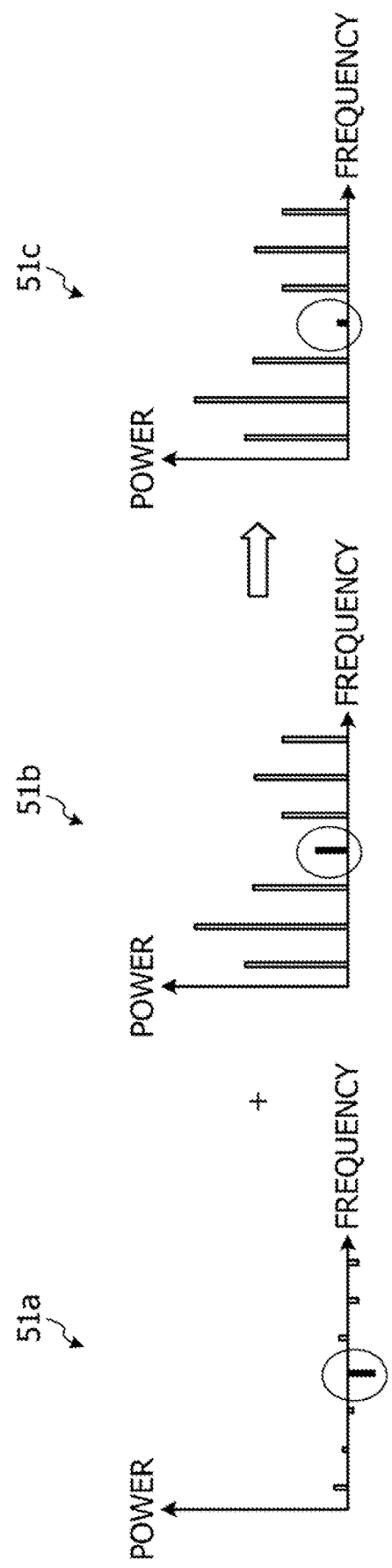
FIG. 13 is a diagram for explaining a process of an inverse emphasis unit according to Embodiment 2.

FIG. 13 is a diagram for explaining a process of an inverse emphasis unit according to Embodiment 2. FIG. 13 illustrates a corrected power spectrum 51a, a noise suppressed power spectrum 51b, and a power spectrum 51c of an addition result. The horizontal axis of each power spectrum 51a, 51b, and 51c is an axis corresponding to a frequency, and the vertical axis is an axis corresponding to power. The inverse emphasis unit 455 adds the corrected power spectrum 51a and the noise suppressed power spectrum 51b so as to generate the power spectrum 51c of the addition result. The inverse emphasis unit 455 executes such a process, so that a subtraction effect is removed.

The inverse emphasis unit 455 outputs the power spectrum 51c of the addition result to the IFFT processing unit 460. In the following description, the power spectrum 51c of the addition result obtained by adding the corrected power spectrum 51a and the noise suppressed power spectrum 51b is simply referred to as "corrected power spectrum".

The IFFT processing unit 460 is a processing unit which corrects power of a spectrum from the FFT processing unit 430 by using a ratio of a power spectrum before correction calculated in the IFFT processing unit 460 to the corrected power spectrum from the inverse emphasis unit 455 and performs inverse Fourier transform so as to convert the corrected power spectrum into a voice signal indicating a relationship between a time and an amplitude. When the IFFT processing unit 460 performs inverse Fourier transform, information on a spectrum notified from the FFT processing unit 430 is used. The IFFT processing unit 460 outputs the voice signal on which inverse Fourier transform is performed to the overlap addition unit 470.

The overlap addition unit 470 is a processing unit which adds each voice signal output from the IFFT processing unit 460 with 50% overlap. The overlap addition unit 470 stores the voice signal overlap-added (the corrected noise suppressed signal) in the corrected voice signal data 410b.

The communication unit 480 is a processing unit which performs data communication between the learning apparatus 300 and the recognition device 40. For example, in a case of receiving a notification of the learning model information 310c from the learning apparatus 300, the communication unit 480 stores the received learning model information 310c in the storage unit 410. The communication unit 480 transmits the noise suppressed signal stored in the corrected voice signal data 410b to the recognition device 40.

Figure 14:
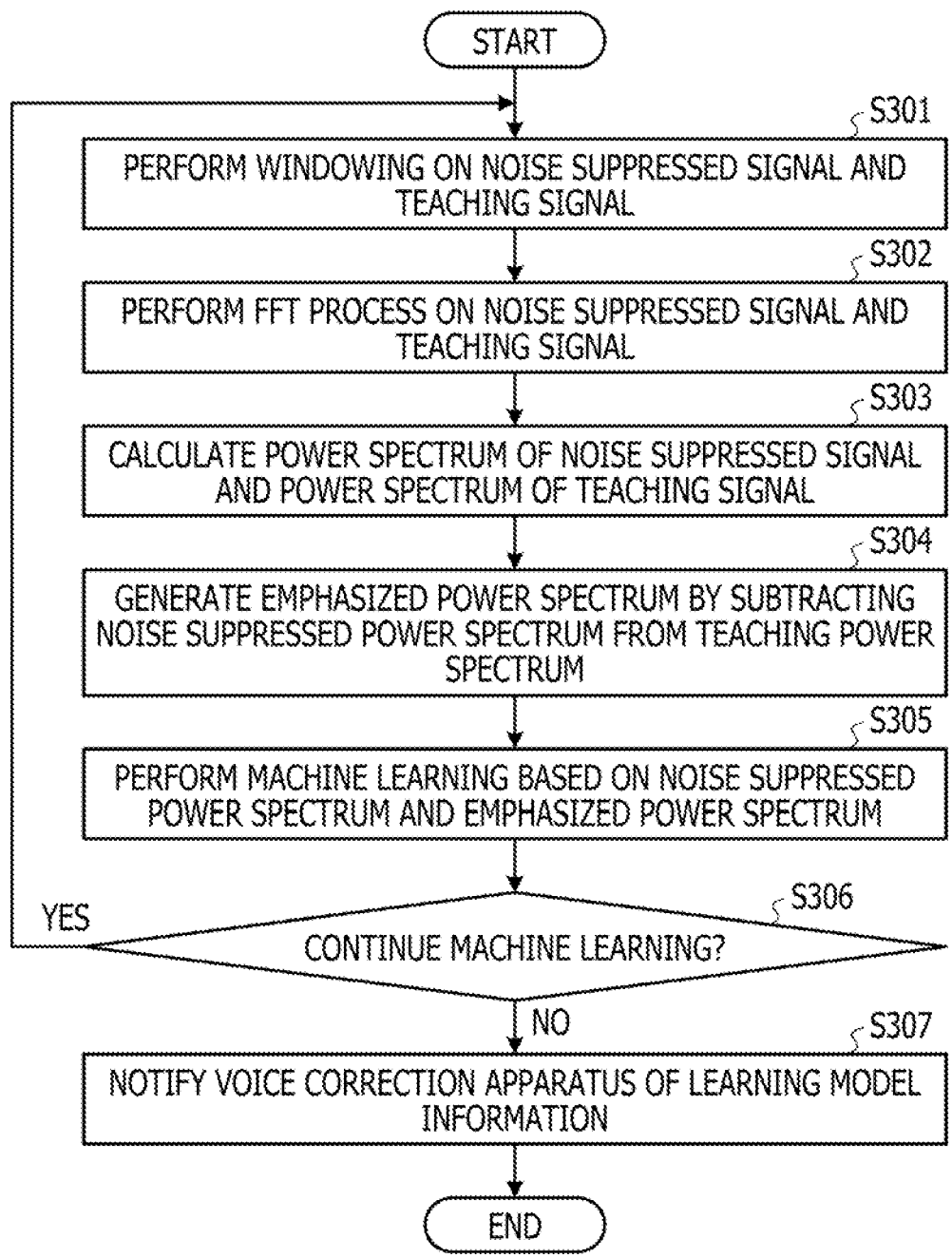
FIG. 14 is a flowchart illustrating a process procedure of the learning apparatus according to Embodiment 2.

Next, an example of a process procedure of the learning apparatus 300 according to Embodiment 2 will be described. FIG. 14 is a flowchart illustrating a process procedure of the learning apparatus according to Embodiment 2. As illustrated in FIG. 14, the windowing unit 320a of the learning apparatus 300 performs windowing on a noise suppressed signal. The windowing unit 320b of the learning apparatus 300 performs windowing on a teaching signal (step S301).

The FFT processing unit 330a of the learning apparatus 300 performs a FFT process on the noise suppressed signal on which the windowing is performed. The FFT processing unit 330b of the learning apparatus 300 performs the FFT process on the teaching signal on which the windowing is performed (step S302).

The power spectrum calculation unit 340a of the learning apparatus 300 calculates a power spectrum (a noise suppressed power spectrum) of the noise suppressed signal after the FFT process. The power spectrum calculation unit 340b of the learning apparatus 300 calculates a power spectrum (a teaching power spectrum) of the teaching signal after the FFT process (step S303).

The emphasis unit 345 of the learning apparatus 300 generates an emphasized power spectrum by subtracting the noise suppressed power spectrum from the teaching power spectrum (step S304).

The learning unit 350 of the learning apparatus 300 performs machine learning based on the noise suppressed power spectrum and the emphasized power spectrum (step S305). In a case of continuing machine learning (Yes in step S306), the learning apparatus 300 proceeds to step S301. On the other hand, in a case of not continuing machine learning (No in step S306), the learning apparatus 300 proceeds to step S307. The notification unit 360 of the learning apparatus 300 notifies the voice correction apparatus 400 of the learning model information 310c (step S307).

Figure 15:
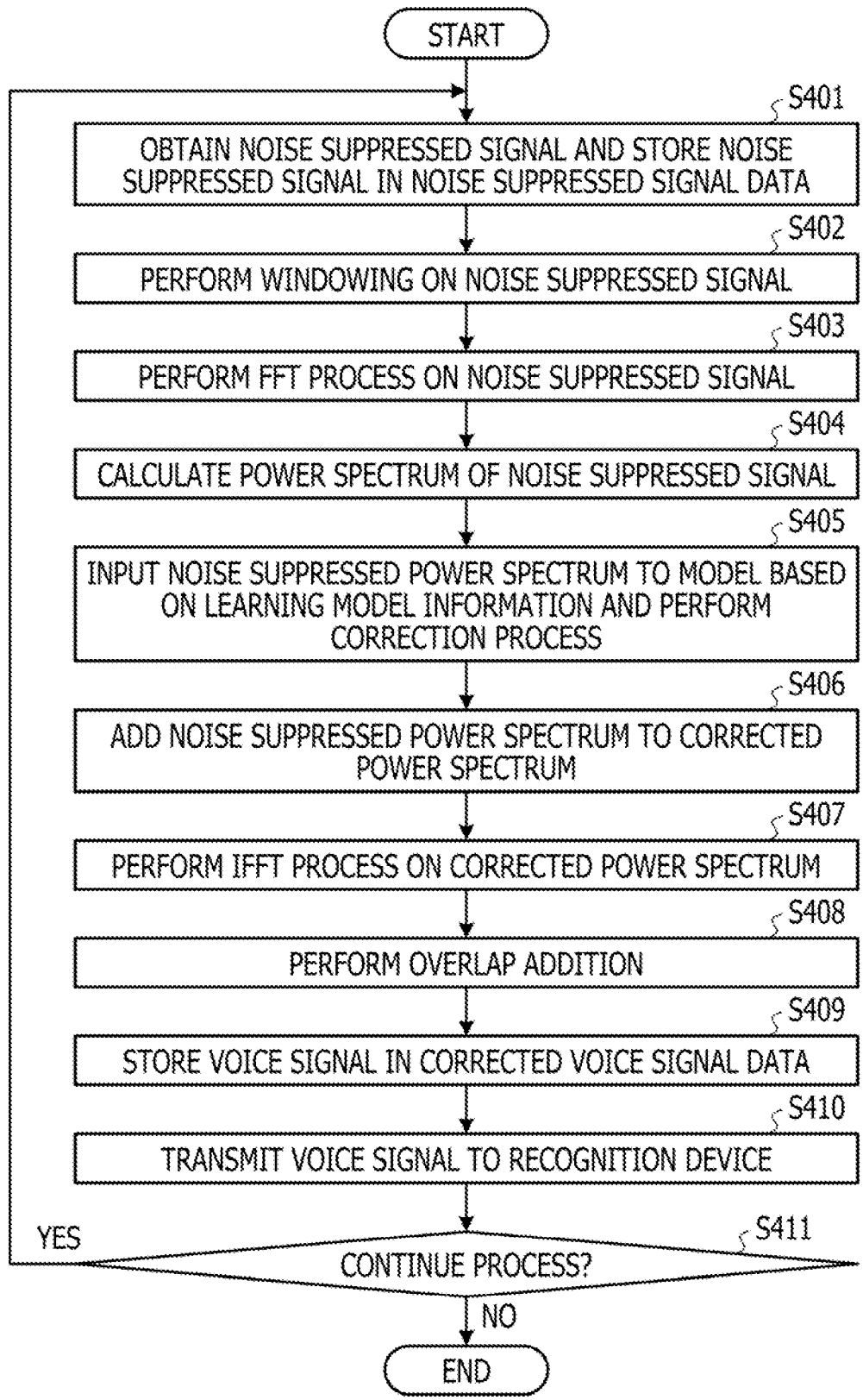
FIG. 15 is a flowchart illustrating a process procedure of the voice correction apparatus according to Embodiment 2.

Next, an example of a process procedure of the voice correction apparatus 400 according to Embodiment 2 will be described. FIG. 15 is a flowchart illustrating a process procedure of the voice correction apparatus according to Embodiment 2. As illustrated in FIG. 15, the obtainment unit 405 of the voice correction apparatus 400 obtains a noise suppressed signal from the noise suppression device 35 and stores the noise suppressed signal in the noise suppressed signal data 410a (step S401).

The windowing unit 420 of the voice correction apparatus 400 performs windowing on the noise suppressed signal (step S402). The FFT processing unit 430 of the voice correction apparatus 400 performs the FFT process on the noise suppressed signal on which the windowing is performed (step S403).

The power spectrum calculation unit 440 of the voice correction apparatus 400 calculates a power spectrum (a noise suppressed power spectrum) of the noise suppressed signal after the FFT process (step S404). The correction unit 450 of the voice correction apparatus 400 inputs the noise suppressed power spectrum to a model based on the learning model information 310c, and performs a correction process (step S405).

The inverse emphasis unit 455 of the voice correction apparatus 400 adds the noise suppressed power spectrum to a corrected power spectrum (step S406).

The IFFT processing unit 460 of the voice correction apparatus 400 performs an IFFT process on the corrected power spectrum (step S407). The overlap addition unit 470 of the voice correction apparatus 400 performs overlap addition (step S408). The overlap addition unit 470 stores the overlap-added voice signal in the corrected voice signal data 410b (step S409).

The communication unit 480 of the voice correction apparatus 400 transmits the voice signal of the corrected voice signal data 410b to the recognition device 40 (step S410). In a case of continuing the process (Yes in step S411), the voice correction apparatus 400 proceeds to step S401. In a case of not continuing the process (No in step S411), the voice correction apparatus 400 terminates the process.

Next, an effect of the learning apparatus 300 and the voice correction apparatus 400 according to Embodiment 2 will be described. The learning apparatus 300 subtracts a noise suppressed power spectrum from a teaching power spectrum so as to generate an emphasized power spectrum in which a component of a band corresponding to a band having a low SNR of a noise suppressed signal is emphasized. The learning apparatus 300 performs machine learning on a model corrected so that a shape of the noise suppressed power spectrum approaches a shape of the emphasized power spectrum. Since a difference between the shape of the power spectrum of the noise suppressed signal and the shape of the power spectrum of the emphasized signal is larger in the band having a low SNR (a band having low power of a power spectrum) according to the emphasis process, in the model learned by machine learning of the learning apparatus 300, the degree of correction for a band having a low SNR is increased.

Based on the model (learning model information) learned by the learning apparatus 300, the voice correction apparatus 400 may correct distortion generated in a band having a low SNR by correcting a noise suppressed signal. According to the correction, it is possible to increase recognition accuracy of a voice signal on which the noise suppression processing is performed in an environment in which noise is generated.

The voice correction apparatus 400 adds the noise suppressed power spectrum to a corrected power spectrum corrected by the correction unit 450. By performing such a process, it is possible to remove an effect by the emphasis process (subtraction) of the learning apparatus 300 from the corrected power spectrum after correcting distortion of the corrected power spectrum.

Meanwhile, although the case where the learning apparatus 300 and the voice correction apparatus 400 described in Embodiment 2 are different apparatuses is described, the learning apparatus 300 and the voice correction apparatus 400 may be included in the same apparatus. For example, the voice correction apparatus 400 may include each data and each processing unit illustrated in FIG. 12, and may perform the same learning process as that of the learning apparatus 300 described above so as to generate the learning model information 310c.

Figure 16:
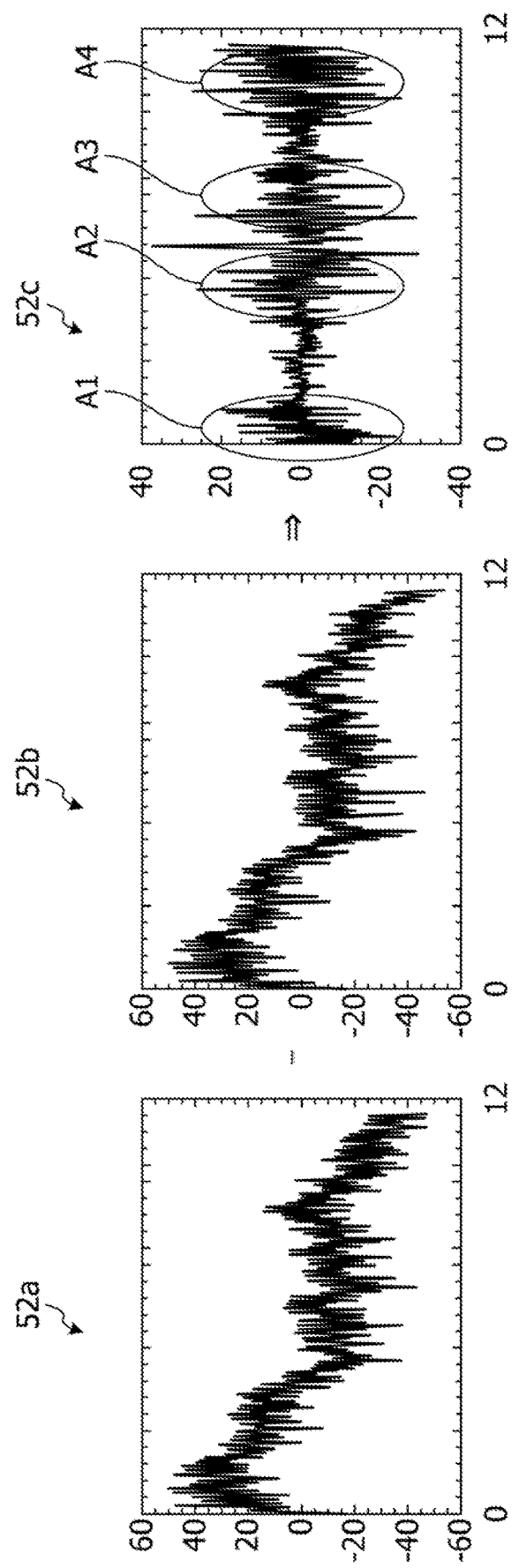
FIG. 16 is a diagram illustrating an emphasis process in a case of using an actual voice signal.

An example of an emphasis process and an inverse emphasis process in a case of using an actual voice signal will be described. FIG. 16 is a diagram illustrating an emphasis process in a case of using an actual voice signal. FIG. 16 illustrates a teaching power spectrum 52a, a noise suppressed power spectrum 52b, and an emphasized power spectrum 52c. The horizontal axis of each power spectrum 52a, 52b, and 52c is an axis corresponding to a frequency, and the vertical axis is an axis corresponding to power. The emphasis unit 345 generates the emphasized power spectrum 52c by subtracting the noise suppressed power spectrum 52b from the teaching power spectrum 52a. In the emphasized power spectrum 52c, power (power including areas A1, A2, A3, and A4) of a frequency corresponding to a band having a low SNR of a noise suppressed signal is emphasized.

Figure 17:
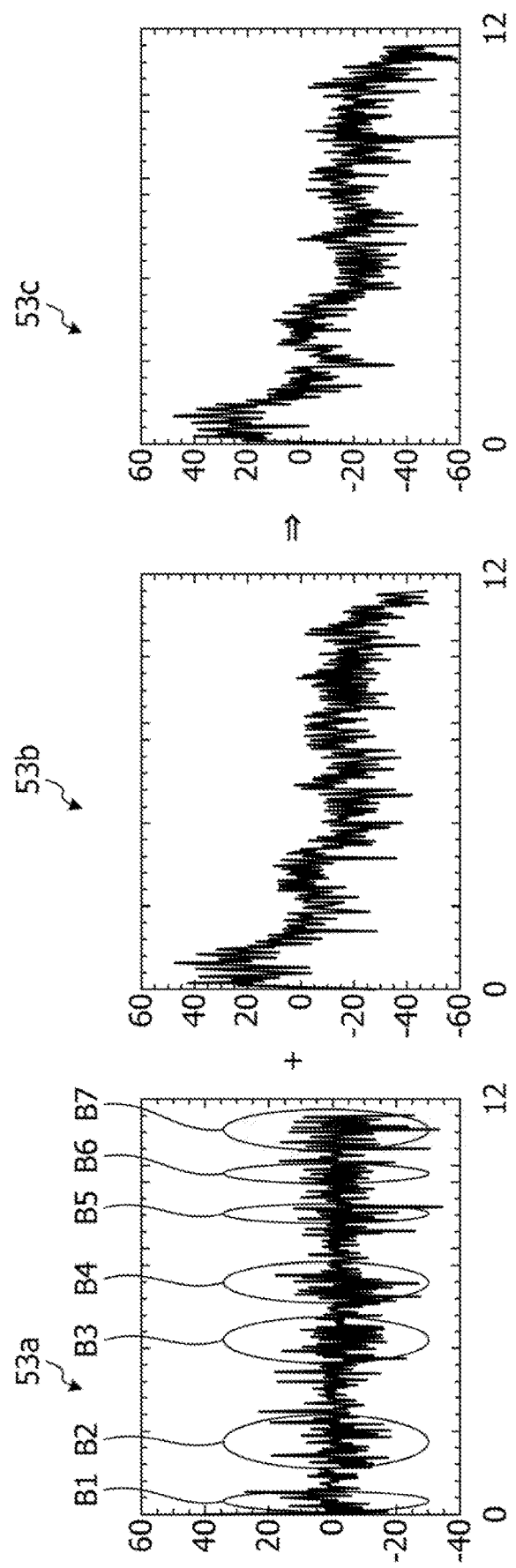
FIG. 17 is a diagram illustrating an inverse emphasis process in a case of using an actual voice signal.

FIG. 17 is a diagram illustrating an inverse emphasis process in a case of using an actual voice signal. FIG. 17 illustrates a corrected power spectrum 53a, a noise suppressed power spectrum 53b, and a power spectrum 53c of an addition result. The horizontal axis of each power spectrum 53a, 53b, and 53c is an axis corresponding to a frequency, and the vertical axis is an axis corresponding to power. The corrected power spectrum 53a in FIG. 17 is a power spectrum corrected by the correction unit 450, and power included in areas B1, B2, B3, B4, B5, B6, and B7 is corrected to be further larger. The areas B1, B2, B3, B4, B5, B6, and B7 correspond to bands having low SNRs of a noise suppressed signal. The inverse emphasis unit 455 adds the corrected power spectrum 53a and the noise suppressed power spectrum 53b so as to generate the power spectrum 53c of the addition result. The inverse emphasis unit 455 executes such a process, so that the subtraction effect in FIG. 16 is removed.

Figure 18:
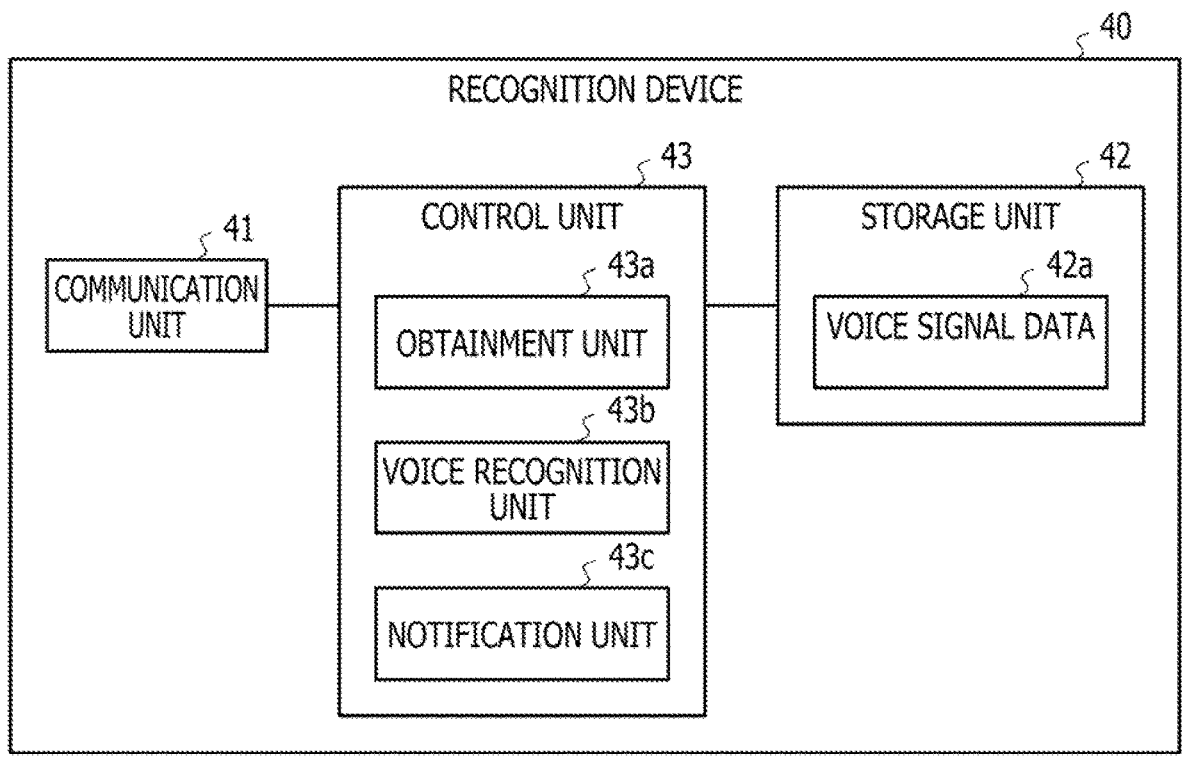
FIG. 18 is a functional block diagram illustrating a configuration of a recognition device.

Next, an example of a configuration of the recognition device 40 according to Embodiments 1 and 2 will be described. FIG. 18 is a functional block diagram illustrating a configuration of a recognition device. As illustrated in FIG. 18, the recognition device 40 includes a communication unit 41, a storage unit 42, and a control unit 43. As an example, a case where the recognition device 40 is coupled to the voice correction apparatus 200 will be described.

The communication unit 41 is a processing unit which performs data communication with the voice correction apparatus 200. For example, the communication unit 41 corresponds to a communication device. The control unit 43 to be described below exchanges data with the voice correction apparatus 200 via the communication unit 41. For example, the communication unit 41 receives a voice signal obtained by correcting a noise suppressed signal, and outputs the received voice signal to the control unit 43.

The storage unit 42 includes a voice signal data 42a. The storage unit 42 corresponds to a semiconductor memory element such as a RAM, a ROM, a flash memory, or a storage device such as an HDD.

The voice signal data 42a is a data area in which a voice signal transmitted from the voice correction apparatus 200 is stored. The voice signal transmitted from the voice correction apparatus 200 is a voice signal obtained by correcting the noise suppressed signal.

The control unit 43 includes an obtainment unit 43a, a voice recognition unit 43b, and a notification unit 43c. The control unit 43 is implemented as a result of a program stored in the recognition device 40 being executed by a CPU, a MPU, or the like by using RAM as a workspace, for example. The control unit 43 may also be implemented by an integrated circuit such as an ASIC or an FPGA, for example.

The obtainment unit 43a is a processing unit which obtains a voice signal from the voice correction apparatus 200 and stores the obtained voice signal in the voice signal data 42a.

The voice recognition unit 43b is a processing unit which obtains the voice signal stored in the voice signal data 42a and performs voice recognition. For example, the voice recognition unit 43b holds voice recognition dictionary information in advance and compares the voice recognition dictionary information with the voice signal so as to perform voice recognition. For example, the voice recognition unit 43b may convert the voice signal into a character string based on a result of the voice recognition, or extract a feature of the voice signal to identify or the like a person corresponding to the voice signal. The voice recognition unit 43b outputs the voice recognition result to the notification unit 43c. The voice recognition unit 43b may store the voice recognition result in the storage unit 42.

The notification unit 43c is a processing unit which notifies an external device (not illustrated) designated in advance of the voice recognition result. The notification unit 43c may output and display the voice recognition result on a display device (not illustrated).

In Embodiments 1 and 2, the case where the voice correction apparatuses 100 and 200 and the recognition device 40 are separate apparatuses is described, but the embodiment is not limited thereto. The voice correction apparatuses 100 and 200 may include each processing unit and each data described with reference to FIG. 18 and perform the same process as the recognition device 40.

Figure 19:
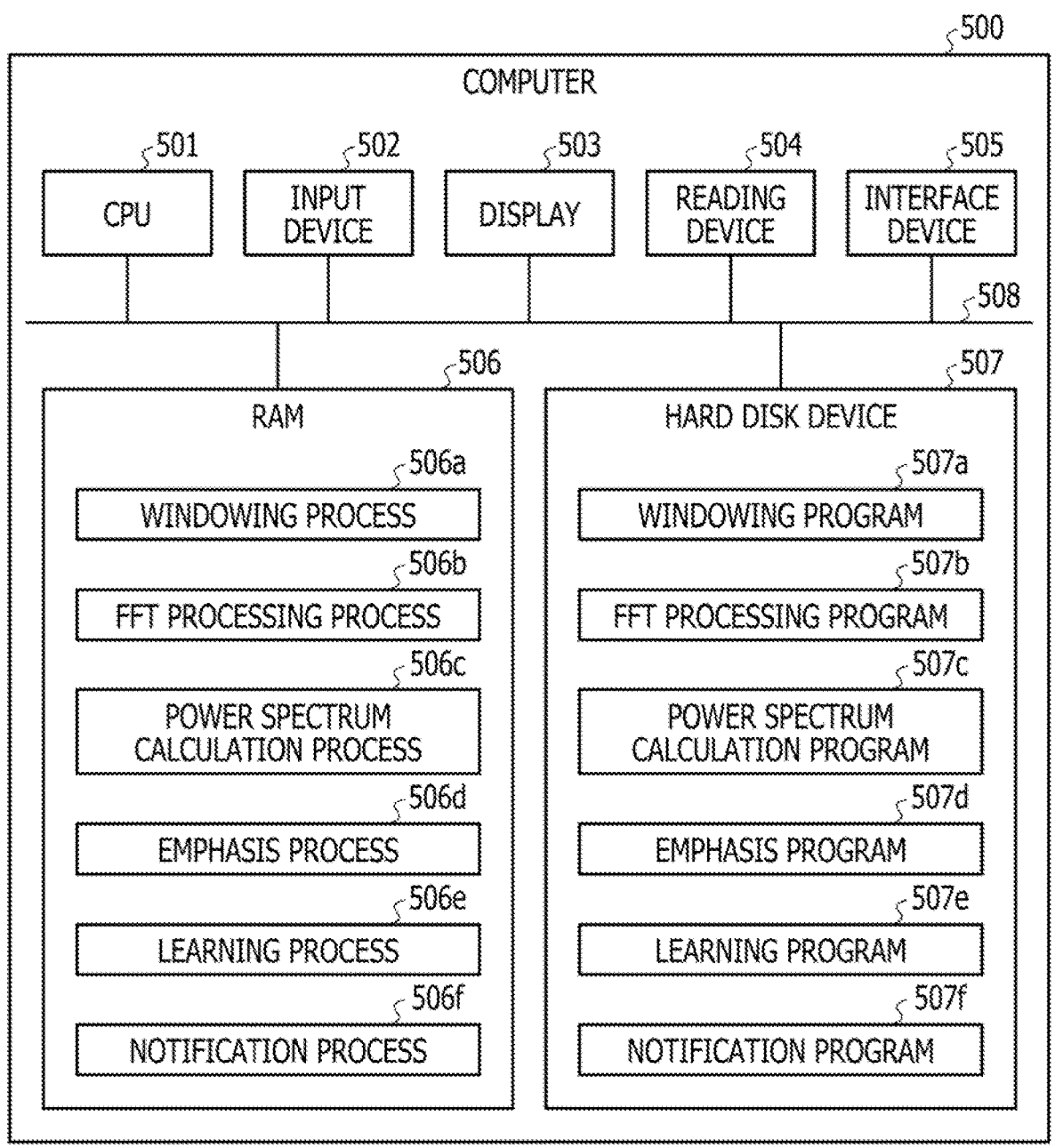
FIG. 19 is a diagram illustrating an example of a hardware configuration of a computer which realizes the same function as the learning apparatus according to the present embodiment.

Next, an example of a hardware configuration of a computer which realizes the same functions as those of the learning apparatuses 100 and 300 and the voice correction apparatuses 200 and 400 described in the embodiments will be described. FIG. 19 is a diagram illustrating an example of a hardware configuration of a computer which realizes the same function as the learning apparatus according to the present embodiment.

As illustrated in FIG. 19, a computer 500 includes a CPU 501 which executes various arithmetic processes, an input device 502 which receives input of data from a user, and a display 503. The computer 500 includes a reading device 504 which reads a program or the like from a storage medium and an interface device 505 which exchanges data with an external device or the like via a wired or wireless network. The computer 500 also includes a RAM 506 which temporarily stores various information and a hard disk device 507. Each of the devices 501 to 507 is coupled to a bus 508.

The hard disk device 507 includes a windowing program 507a, an FFT processing program 507b, a power spectrum calculation program 507c, an emphasis program 507d, a learning program 507e, and a notification program 507f. The CPU 501 reads the windowing program 507a, the FFT processing program 507b, the power spectrum calculation program 507c, the emphasis program 507d, the learning program 507e, and the notification program 507f into the RAM 506.

The windowing program 507a functions as a windowing process 506a. The FFT processing program 507b functions as an FFT processing process 506b. The power spectrum calculation program 507c functions as a power spectrum calculation process 506c. The emphasis program 507d functions as an emphasis process 506d, The learning program 507e functions as a learning process 506e. The notification program 507f functions as a notification process 506f.

A process of the windowing process 506a corresponds to the processes of the windowing units 120a, 120b, 320a, and 320b. A process of the FFT processing process 506b corresponds to the processes of the FFT processing units 130a, 130b, 330a, and 330b. A process of the power spectrum calculation process 506c corresponds to the processes of the power spectrum calculation units 140a, 140b, 340a, and 340b. A process of the emphasis process 506d corresponds to the processes of the emphasis units 145 and 345. A process of the learning process 506e corresponds to the processes of the learning units 150 and 350. A process of the notification process 506f corresponds to the processes of the notification units 160 and 360.

The programs 507a to 507f may not be stored in the hard disk device 507 from the beginning. For example, each program may be stored in a "portable physical medium" such as a flexible disk (FD), a compact disc read-only memory (CD-ROM), a digital versatile disc (DVD), a magneto-optical disk, an IC card, or the like inserted in the computer 500. The computer 500 may read and execute the programs 507a to 507f.

Figure 20:
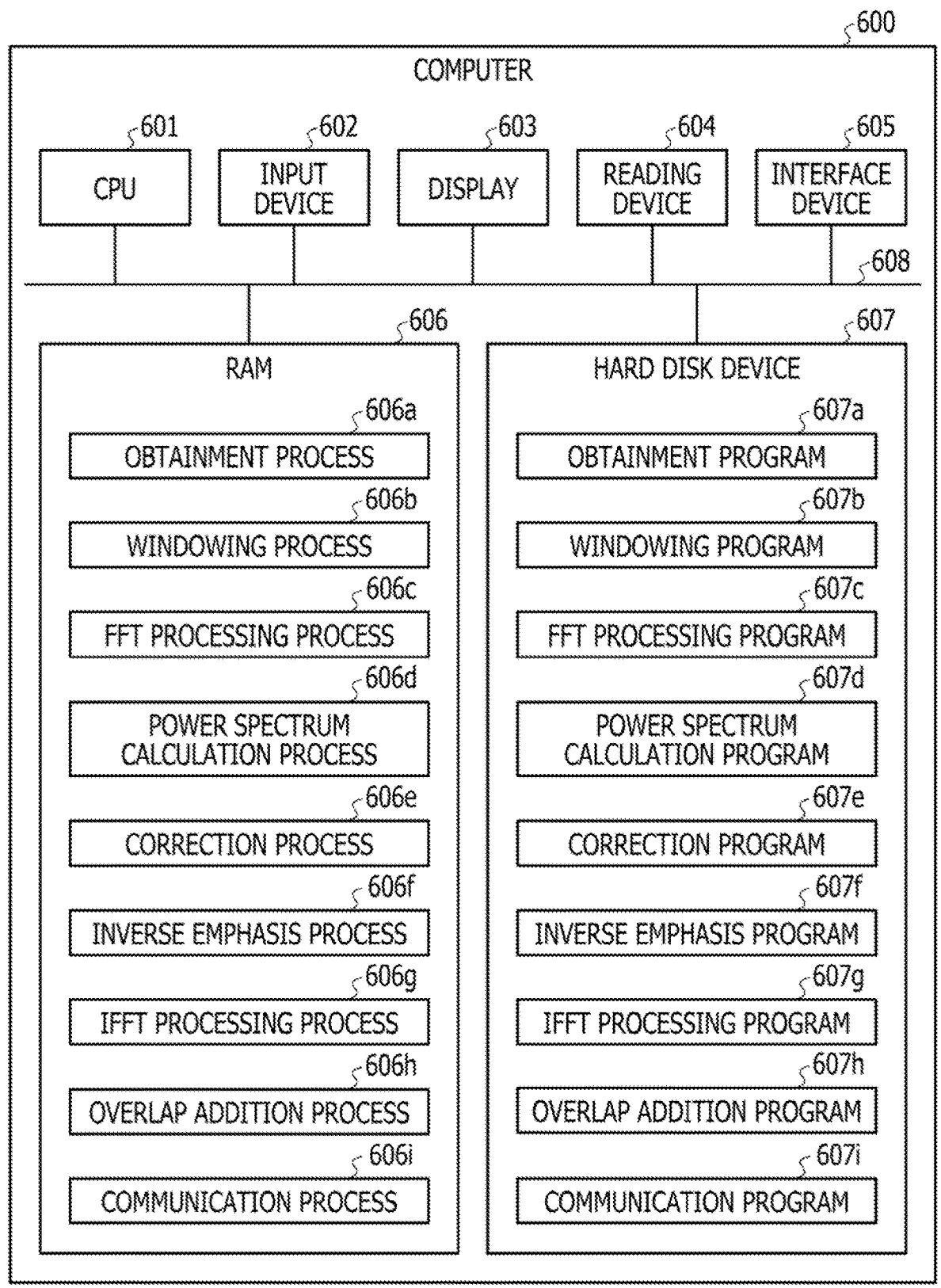
FIG. 20 is a diagram illustrating an example of a hardware configuration of a computer which realizes the same function as the voice correction apparatus according to the present embodiment.

FIG. 20 is a diagram illustrating an example of a hardware configuration of a computer which realizes the same function as the voice correction apparatus according to the present embodiment.

As illustrated in FIG. 20, a computer 600 includes a CPU 601 which executes various arithmetic processes, an input device 602 which receives input of data from a user, and a display 603. The computer 600 includes a reading device 604 which reads a program or the like from a storage medium and an interface device 605 which exchanges data with an external device or the like via a wired or wireless network. The computer 600 also includes a RAM 606 which temporarily stores various information and a hard disk device 607. Each of the devices 601 to 607 is coupled to a bus 608.

The hard disk device 607 includes an obtainment program 607a, a windowing program 607b, an FFT processing program 607c, a power spectrum calculation program 607d, and a correction program 607e. The hard disk device 607 includes an inverse emphasis program 607f, an IFFT processing program 607g, an overlap addition program 607h, and a communication program 607i. The CPU 601 reads the programs 607a to 607i into the RAM 606.

The obtainment program 607a functions as an obtainment process 606a, The windowing program 607b functions as a windowing process 606b. The FFT processing program 607c functions as an FFT processing process 606c, The power spectrum calculation program 607d functions as a power spectrum calculation process 606d. The correction program 607e functions as a correction process 606e. The inverse emphasis program 607f functions as an inverse emphasis process 606f. The IFFT processing program 607g functions as an IFFT processing process 606g. The overlap addition program 607h functions as an overlap addition process 606h. The communication program 607i functions as a communication process 606i.

A process of the obtainment process 606a corresponds to the processes of the obtainment units 205 and 405. A process of the windowing process 606b corresponds to the processes of the windowing units 220 and 420. A process of the FFT processing process 606c corresponds to the processes of the FFT processing units 230 and 430. A process of the power spectrum calculation process 606d corresponds to the processes of the power spectrum calculation units 240 and 440. The correction process 606e corresponds to the processes of the correction units 250 and 450. A process of the inverse emphasis process 606f corresponds to the processes of the inverse emphasis units 255 and 455. A process of the IFFT processing process 606g corresponds to the processes of the IFFT processing units 260 and 460. The overlap addition process 606h corresponds to the processes of the overlap addition units 270 and 470, A process of the communication process 606i corresponds to the processes of the communication units 280 and 480.

The programs 607a to 607i may not be stored in the hard disk device 607 from the beginning. For example, each program may be stored in a "portable physical medium" such as a flexible disk (FD), a CD-ROM, a DVD, a magneto-optical disk, an IC card, or the like inserted in the computer 600. The computer 600 may read and execute the programs 607a to 607i.

Figure 21:
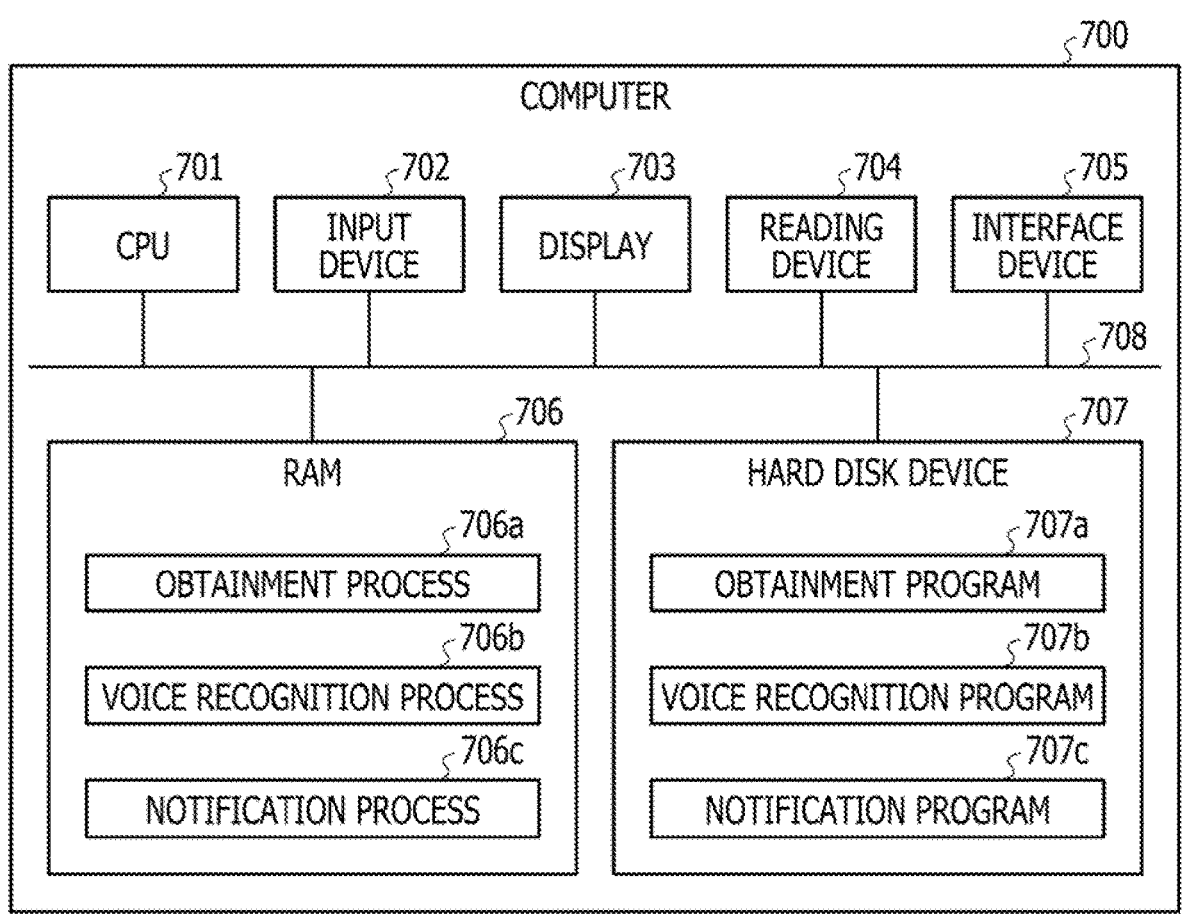
FIG. 21 is a diagram illustrating an example of a hardware configuration of a computer which realizes the same function as the recognition device according to the present embodiment.
Figure 22:
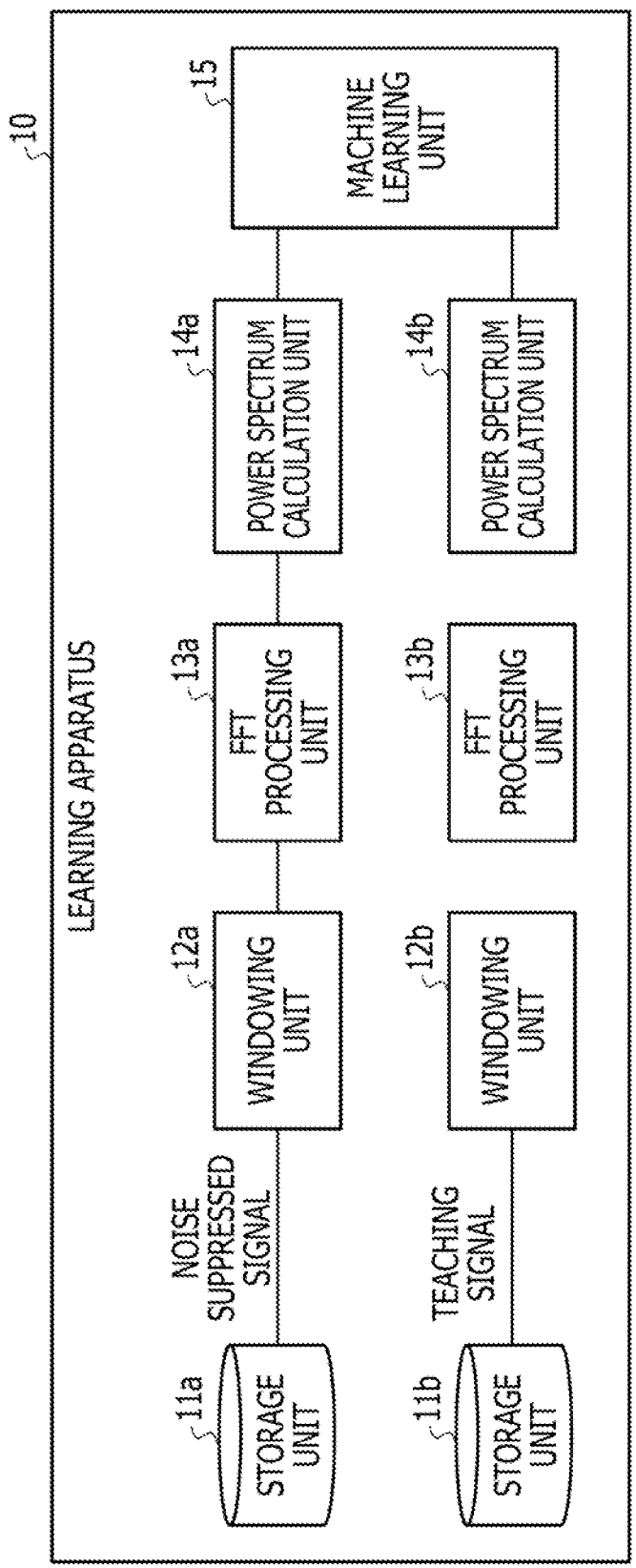
FIG. 22 is a diagram for explaining a learning process according to the related art.
Figure 23:
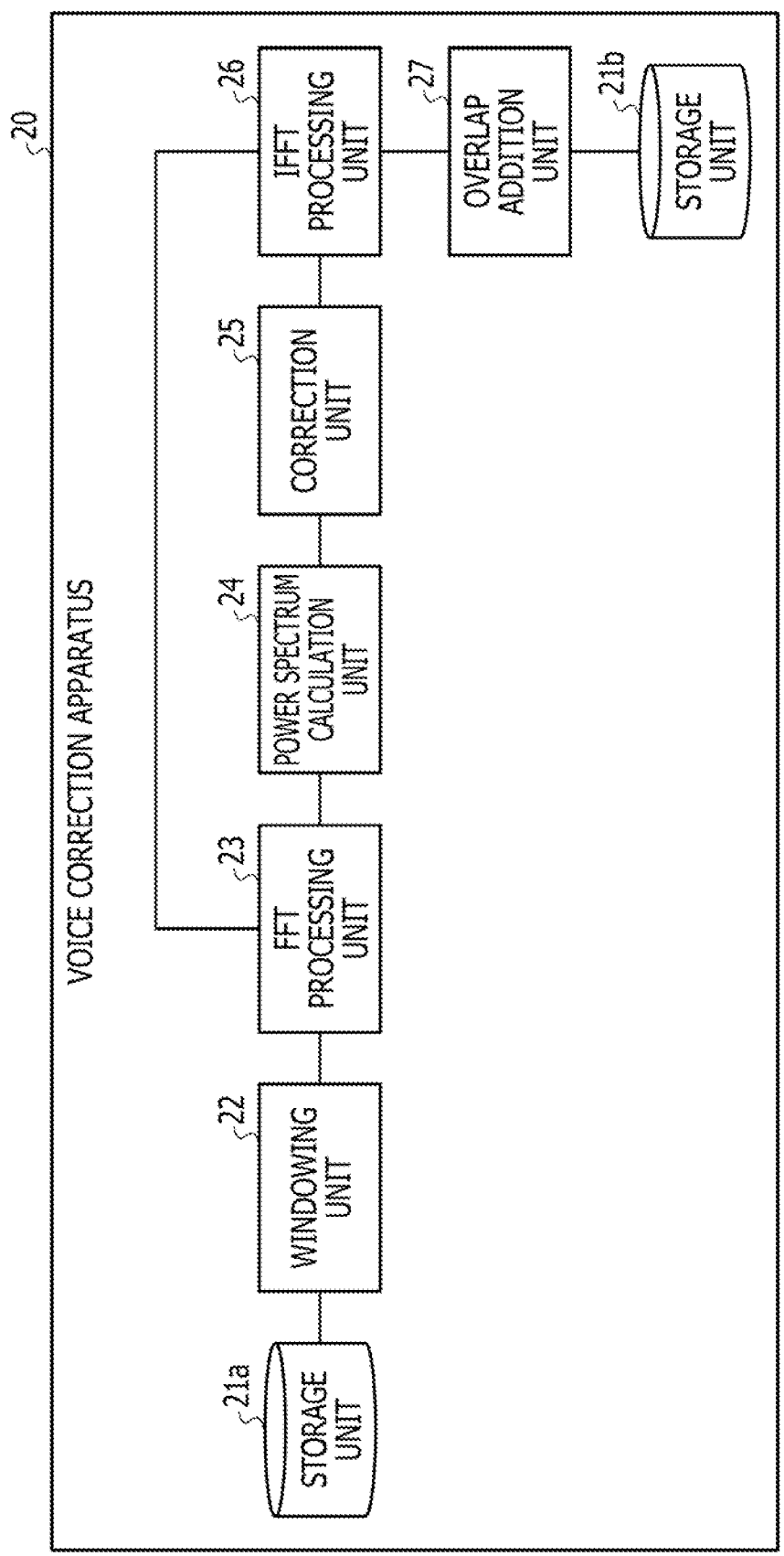
FIG. 23 is a diagram for explaining a correction process according to the related art.

FIG. 21 is a diagram illustrating an example of a hardware configuration of a computer which realizes the same function as the recognition device according to the present embodiment. A computer 700 includes a CPU 701 which executes various arithmetic processes, an input device 702 which receives input of data from a user, and a display 703. The computer 700 includes a reading device 704 which reads a program or the like from a storage medium and an interface device 705 which exchanges data with an external device or the like via a wired or wireless network. The computer 700 also includes a RAM 706 which temporarily stores various information and a hard disk device 707. Each of the devices 701 to 707 is coupled to a bus 708.

The hard disk device 707 includes an obtainment program 707a, a voice recognition program 707b, and a notification program 707c. The CPU 701 reads the programs 707a to 707c into the RAM 706.

The obtainment program 707a functions as an obtainment process 706a. The voice recognition program 707b functions as a voice recognition process 706b. The notification program 707c functions as a notification process 706c.

A process of the obtainment process 706a corresponds to the process of the obtainment unit 43a. A process of the voice recognition process 706b corresponds to the process of the voice recognition unit 43b. A process of the notification process 706c corresponds to the process of the notification unit 43c.

The programs 707a to 707c may not be stored in the hard disk device 707 from the beginning. For example, each program may be stored in a "portable physical medium" such as a flexible disk (FD), a CD-ROM, a DVD, a magneto-optical disk, an IC card, or the like inserted in the computer 700. The computer 700 may read and execute the programs 707a to 707c.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A voice correction apparatus comprising:
a memory; and
a processor coupled to the memory, the processor being configured to:
execute an emphasis processing configured to
obtain first voice information which is voice information recorded when noise is generated and on which noise suppression processing is performed to yield a noise suppressed first voice information and second voice information indicating voice information recorded in an environment in which no noise is generated, and
generate emphasized information by emphasizing a component of a band, corresponding to a band having a low signal noise ratio (SNR) of the noise suppressed first voice information, among bands of the second voice information;
execute a learning processing configured to perform machine learning on a model based on the noise suppressed first voice information and the emphasized information; and
execute a correction processing configured to generate corrected voice information by correcting third voice information on which noise suppression processing is performed, based on the model machine-learned by the learning processing.

2. The voice correction apparatus according to claim 1, wherein the emphasis processing is configured to specify a band with a component having a value less than a threshold value as a band to be emphasized among bands of the second voice information and multiples a component of a band corresponding to the band to be emphasized among the bands of the second voice information by a gain exceeding 1 to generate the emphasized information.

3. The voice correction apparatus according to claim 2, wherein the processor is further configured to:
execute an inverse emphasis processing configured to divide a component of a band, corresponding to the band to be emphasized, among bands of the corrected voice information corrected by the correction processing by the gain; and
execute a voice recognition processing configured to perform voice recognition based on information obtained by dividing the component of the band corresponding to the band to be emphasized among the bands of the corrected voice information by the gain.

4. The voice correction apparatus according to claim 1, wherein the emphasis processing is configured to subtract the noise suppressed first voice information from the second voice information to generate the emphasized information.

5. The voice correction apparatus according to claim 4, wherein the processor is further configured to:
execute an inverse emphasis processing configured to add the third voice information to the corrected voice information corrected by the correction processing; and
execute a voice recognition processing configured to perform voice recognition based on information obtained by adding the third voice information to the corrected voice information.

6. A voice correction method implemented by a computer, the method comprising:
obtaining first voice information which is voice information recorded when noise is generated and on which noise suppression processing is performed to yield a noise suppressed first voice information and second voice information indicating voice information recorded in an environment in which no noise is generated;
generating emphasized information by emphasizing a component of a band, corresponding to a band having a low signal noise ratio (SNR) of the noise suppressed first voice information, among bands of the second voice information;
performing machine learning on a model based on the noise suppressed first voice information and the emphasized information; and
generating corrected voice information by correcting third voice information on which noise suppression processing is performed, based on the machine-learned model.

* * * * *